(12) United States Patent
Hird et al.

(10) Patent No.: US 11,668,184 B2
(45) Date of Patent: Jun. 6, 2023

(54) INSTRUMENTED ROTARY TOOL WITH COMPLIANT CONNECTING PORTIONS

(71) Applicant: Schlumberger Technology Corporation, Sugar Land, TX (US)

(72) Inventors: Jonathan Robert Hird, Dry Drayton (GB); Ashley Bernard Johnson, Cambridge (GB); Michael Paul Barrett, Histon (GB); Walter David Aldred, Thriplow (GB); Tomas Rosinski, Cramlington (GB); Jarek Rosinski, Cramlington (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 539 days.

(21) Appl. No.: 16/833,758

(22) Filed: Mar. 30, 2020

(65) Prior Publication Data

US 2020/0308955 A1  Oct. 1, 2020

Related U.S. Application Data

(60) Provisional application No. 62/827,516, filed on Apr. 1, 2019.

(51) Int. Cl.
*E21B 47/01* (2012.01)
*E21B 7/06* (2006.01)
(Continued)

(52) U.S. Cl.
CPC ............ *E21B 47/013* (2020.05); *E21B 47/01* (2013.01); *G01B 21/32* (2013.01); *G01L 1/2206* (2013.01);
(Continued)

(58) Field of Classification Search
CPC ........ E21B 47/013; E21B 7/062; E21B 47/00; E21B 7/06; E21B 7/067; E21B 47/01;
(Continued)

(56) References Cited

U.S. PATENT DOCUMENTS

| 5,113,953 A | 5/1992 | Noble |
| 5,309,260 A | 5/1994 | Mizrahi et al. |

(Continued)

FOREIGN PATENT DOCUMENTS

WO  2020205460 A1  10/2020

OTHER PUBLICATIONS

Office Action in U.S. Appl. No. 16/833,719, dated Jul. 8, 2021, 8 pages.

(Continued)

*Primary Examiner* — Brandi N Hopkins
(74) *Attorney, Agent, or Firm* — Jeffrey D. Frantz

(57) ABSTRACT

A rotary tool for operation within an underground wellbore or within tubing in a wellbore has at least one force-sensitive element attached to the tool body and positioned to contact the conduit wall, wherein the force-sensitive element comprises an outer portion to contact the wellbore or tubing wall, at least one connecting portion which is more compliant than the outer portion and through which the outer portion is connected to the tool body, and at least one sensor responsive to force on the outer portion transmitted through the force-sensitive element to the tool body. The sensors may resolve forces into measurable forces on three axes. Possible rotary tools include drill bit, reamer, mill, stabilizer and rotary steerable system for a drill bit.

20 Claims, 18 Drawing Sheets

(51) Int. Cl.
    *G01L 1/22*         (2006.01)
    *E21B 47/013*      (2012.01)
    *G01B 21/32*       (2006.01)
    *E21B 47/18*       (2012.01)
    *E21B 10/42*       (2006.01)
    *E21B 10/32*       (2006.01)
    *E21B 29/00*       (2006.01)
    *E21B 17/10*       (2006.01)

(52) U.S. Cl.
    CPC ................ *E21B 7/06* (2013.01); *E21B 10/32* (2013.01); *E21B 10/42* (2013.01); *E21B 17/1078* (2013.01); *E21B 29/002* (2013.01); *E21B 47/18* (2013.01)

(58) Field of Classification Search
    CPC .......... E21B 10/26; E21B 10/42; E21B 7/064; E21B 10/00; E21B 44/005; E21B 10/55; E21B 10/43; E21B 10/62; E21B 10/322; E21B 10/567; E21B 10/61; E21B 17/1092; E21B 44/04; E21B 17/076; E21B 10/32; E21B 47/007; E21B 47/017; E21B 47/07; E21B 47/024; E21B 47/12; E21B 17/1078; E21B 29/002; E21B 47/18; G01B 21/32; G01L 1/2206
See application file for complete search history.

(56) References Cited

U.S. PATENT DOCUMENTS

| | | |
|---|---|---|
| 5,502,255 A | 3/1996 | Keana et al. |
| 5,706,905 A | 1/1998 | Barr |
| 5,956,442 A | 9/1999 | Byron |
| 5,971,085 A | 10/1999 | Colebrook |
| 6,089,332 A | 7/2000 | Barr et al. |
| 6,092,610 A | 7/2000 | Kosmala et al. |
| 6,158,529 A | 12/2000 | Dorel |
| 6,244,361 B1 | 6/2001 | Comeau et al. |
| 6,364,034 B1 | 4/2002 | Schoeffler |
| 6,732,817 B2 | 5/2004 | Dewey et al. |
| 6,957,708 B2 | 10/2005 | Chemali et al. |
| 7,188,685 B2 | 3/2007 | Downton et al. |
| 7,954,564 B2 | 6/2011 | Makkar et al. |
| 8,672,056 B2 | 3/2014 | Clark et al. |
| 10,353,111 B2 | 7/2019 | Sanstrom et al. |
| 2001/0052428 A1 | 12/2001 | Larronde et al. |
| 2006/0065395 A1* | 3/2006 | Snell .............. E21B 47/01 175/45 |
| 2012/0000707 A1* | 1/2012 | Hall ............... E02F 3/16 175/428 |
| 2014/0262513 A1 | 9/2014 | Chau et al. |
| 2017/0199295 A1 | 7/2017 | Mandal |
| 2018/0252090 A1 | 9/2018 | Borg-Bartolo et al. |
| 2019/0055833 A1 | 2/2019 | Jaaskelainen |
| 2019/0249548 A1 | 8/2019 | Zhang et al. |
| 2020/0308954 A1 | 10/2020 | Hird et al. |

OTHER PUBLICATIONS

Office Action in U.S. Appl. No. 16/833,719, dated Dec. 7, 2021, 10 pages.

\* cited by examiner

INSTRUMENTED ROTARY TOOL WITH COMPLIANT CONNECTING PORTIONS

CROSS-REFERENCE TO RELATED APPLICATIONS

This application claims the benefit of, and priority to, U.S. Patent Application No. 62/827,516, filed Apr. 1, 2019. This application is also related to U.S. Patent Application No. 62/827,549, filed Apr. 1, 2019 and to U.S. Patent Application No. 62/827,373, filed Apr. 1, 2019. Each of the foregoing is expressly incorporated herein by this reference in its entirety.

BACKGROUND

When rotary tools are used in a wellbore, some such tools may contact the wall of the wellbore. This contact may serve to drill, enlarge, or position the tool in the wellbore, or to act as a contact point for steering a wellbore in a particular direction. FIG. 2 illustrates an example fixed cutter drill bit fitted with cutters for drilling through formations of rock to form a wellbore. This drill bit has a main body which is rigidly connected to a shank terminating in a threaded connection 5 for connecting the drill bit to a drill string (not shown in FIG. 2) that is employed to rotate the bit in order to drill the wellbore. Blades 6 carry cutters 8 that project from the body of the drill bit and which are separated by channels 9 (e.g., fluid courses or junk slots) for flow of drilling fluid supplied down the drill string and delivered through nozzles or other apertures in the drill bit. At the outer end of each blade 6 there is a region 7—referred to as a gauge pad—that reflects the maximum radial distance of the blade 6 from the longitudinal axis of the bit. The gauge pad surface may form part of a cylinder centered on the rotational axis of the drill bit and having the radius equal to that cut by the outermost cutters. These gauge pads 7 are thus able and intended to slide on the wall of the wellbore as it is drilled, thereby positioning the drill bit in the wellbore. In practice the drill bit and gauge pads are subject to vibration and so the pads may make intermittent, rather than continuous, sliding contact with the wellbore wall.

FIG. 3 is a perspective view of a cutter block of an expandable reamer. This block is one three blocks that may selectively expand from positions distributed azimuthally around the main body of the reamer. Expansion of these blocks is guided by splines 14 which engage grooves in the main body of the reamer. This cutter block has upper and lower cutting regions 10, 12 carrying cutters 8, and a middle section 11 which includes a gauge pad 13. This gauge pad has a generally smooth outward facing surface at the radius cut by the outermost cutters so as to slide on the wellbore wall which has been enlarged by the cutters of one or more of the cutting regions 10, 12.

SUMMARY

This summary is provided to introduce a selection of concepts that are further elaborated below in the detailed description. This summary is not intended to be used as an aid in limiting the scope of the claimed subject matter.

Embodiments of the present disclosure seek to enable measurement of force on parts of a rotary tool which contact the wall of a conduit in which the tool is operated. An aspect of the present disclosure provides a rotary tool for operation within an underground wellbore, the tool including a tool body with at least one force-sensitive element coupled to the tool body and configured to contact the wellbore or other conduit wall. This force-sensitive element may include an outer portion to contact the conduit wall, at least one connecting portion through which the outer portion is connected to the tool body, and at least one sensor responsive to force on the outer portion. This force may be transmitted through the force-sensitive element to the tool body.

The outer portion may be configured for sliding contact with the wellbore wall and may have a smooth outer surface for this reason. However, the outer portion optionally includes cutters to remove material from the conduit wall, or has a rough outer surface intended to abrade some material from the conduit wall.

In the same or other embodiments, a connecting portion may be more compliant than the outer portion so as to show greater distortion than the outer portion and thereby facilitate observation of force on the outer portion by giving a larger dimensional change to observe.

The force-sensitive element may be a component part or assembly attached to the tool body. However, it is possible that at least a part of the force-sensitive element is fabricated integrally with the drill bit or other rotary tool.

Any number of types of sensors may be employed and may be responsive to force in different ways. The type and position of a sensor may be such that it is directly responsive to force transmitted from the outer portion and applied to the sensor. In some forms of force-sensitive elements, however, a sensor is responsive to distortion of the force-sensitive element and through that route is responsive to the force causing the distortion. In an illustrative example embodiment, a sensor is responsive to change in relative position of parts of the force-sensitive element when force on the outer portion causes distortion within the force-sensitive element. The parts which change in relative position may not themselves be distorted by force on the outer portion. For instance, it is possible that force on an outer portion causes distortion of connecting portions which are more compliant than the outer portion, but a sensor observes change in relative position of the outer portion and another part which are joined by the connecting portions. In another embodiment, a force-sensitive element includes a sensor directly observes and is responsive to distortion of a connecting portion.

Distortion within a force-sensitive element caused by force on the outer portion can also be referred to as strain caused by stress (i.e. generated from a force) on the outer portion. A force-sensitive element may be designed and dimensioned with an intention that distortion during use will remain within the elastic limits of constructional materials and so will be no more than reversible, elastic strain. However, a sensor may have ability to observe and be responsive to distortion which exceeds an elastic limit.

A connecting portion may be more compliant in one or more directions than the outer portion because it differs from the outer portion in dimensions, materials, or both. In some embodiments, a plurality of connecting portions through which the outer portion is attached to the tool body have a combined cross-sectional area facing toward the conduit wall (i.e., cross-sectional area transverse to one or more imaginary radii from the tool axis) that is less than the surface area of the outer portion that is configured to face and contact the conduit wall.

Output from a sensor in response to force or distortion may be quantitatively related to the magnitude of the force on the outer portion. Quantitative output from one or more sensors may be used in a number of ways. One example is to observe output over a period of time to ascertain whether the output is constant, varying randomly by a small or large amount, or varying with a constant frequency or regular pattern. A constant output or small random variation would indicate smooth operation. A large variation may suggest vibration or stick-slip, and an output with periodic variation might indicate that the tool is in a state of whirl in which the tool moves bodily around the conduit axis. If desired, a force-sensitive element may be calibrated so that numerical measurements of the magnitude of force can be derived from the output received from its sensor or sensors.

A force-sensitive element may have an output from one or more sensors that is dependent on the direction of force and the resulting distortion. This may be used to separate observation of force in one direction from force in another direction. A force-sensitive element with a plurality of sensors may be configured to enable separate observations of magnitudes of forces in different directions as the outer portion contacts the conduit wall. One example embodiment includes the connecting portion or sections with sensors that are configured to enable observation of forces acting radially, axially, and tangentially (i.e. circumferentially) relative to the tool.

In practice, a plurality of connecting portions may be positioned to be responsive to forces in different directions. For instance, one connecting portion may be positioned so that it is more compliant in the axial direction of the tool than in the circumferential direction, while a second connecting portion has greater compliance in the circumferential direction of the tool than in the axial direction. Sensors on the two connecting portions would then have different responses to distortions arising from axial and circumferential forces. Another embodiment utilizes a plurality of sensors with responses which differ depending on the direction of distortion.

Any of a variety of types of sensors may be used. A sensor to observe and respond to distortion (i.e. strain) of a connecting portion may be attached to a connecting portion so that the sensor will undergo strain when the connecting portion undergoes strain. Electrical resistance can be used for this purpose, as may include optical fiber sensors using Bragg gratings, or piezoelectric and piezoresistive sensors. Sensors responsive to changes in relative position may be capacitive sensors. A sensor that is directly responsive to force applied to it may be a piezoelectric or piezoresistive sensor.

In a further aspect this disclosure provides a method of observing force on a rotary tool by equipping the tool with one or more force sensing elements as described herein, using the rotary tool in a conduit, and observing or recording data from the sensor(s) thereof while operating the tool. The present disclosure also includes a method of observing force on a rotary drill string within a conduit by incorporating at least one rotary tool into the drill string and observing or recording data from a sensor or sensors of a tool as described herein.

DETAILED DESCRIPTION

Embodiments of the present disclosure relate to providing instrumentation in a rotary tool for operation in an underground conduit. Possible types of conduits include wellbores that extend into geological formations from the Earth's surface (where surface may be ground level at which the ground meets atmosphere or may be the seabed at which ground meets water). When a wellbore is drilled, at least part of the wellbore may be lined with casing or liner and the present disclosure includes rotary tools for operation within cased/lined wellbores as well as within fully or partially openhole wellbores.

Figure 1:
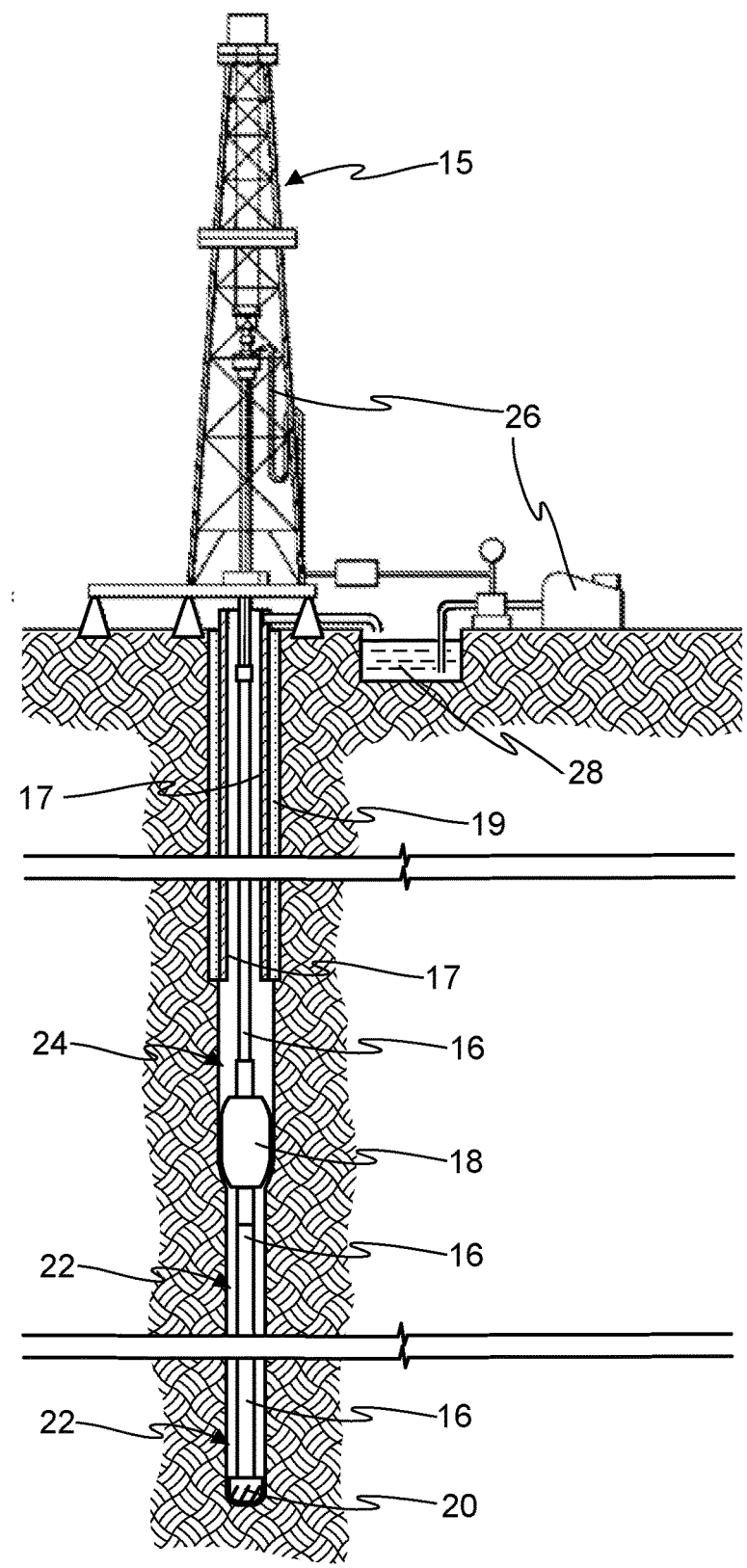
FIG. 1 is a schematic, partial cross-sectional view of a drilling assembly in a wellbore.

Drilling a wellbore is illustrated by FIG. 1 which shows by way of example a drilling assembly of a known type. This includes both a drill bit 20 and an expandable underreamer 18. A drill string 16 extends from a drilling rig 15 into a wellbore. An upper part of the wellbore has already been lined with casing 17 and cemented as indicated at 19. The drill string 16 is connected to an underreamer 18 which is connected by more of the drill string 16 to the drill bit 20. The underreamer 18 has been expanded below the cased section of the wellbore. As the drill string 16 is rotated and moved downwardly in the wellbore, the drill bit 20 extends a pilot hole 22 downwards while the underreamer 18 opens the pilot hole 22 to a larger diameter wellbore 24.

The drilling rig 15 is provided with a system 26 for pumping drilling fluid from a supply 28 down the drill string 16 to the underreamer 18 and the drill bit 20. Some of this drilling fluid optionally flows through ports or other passages in the underreamer 18, into the annulus around the drill string 16, and back up the annulus to the surface. Additional quantities of drilling fluid flow through the interior of the reamer and downwardly in the bottomhole assembly (BHA) to the drill bit 20, where the fluid flows out through nozzles or ports, into the annulus around the drill string 12, and back to the surface. The distance between the underreamer 18 and the drill bit 20 at the foot of the bottom hole assembly is fixed so that the pilot hole 22 and the enlarged wellbore 24 are simultaneously extended downwardly.

It will of course be understood that it would be possible to drill without the underreamer 18 present, so that the wellbore is drilled at the diameter of the drill bit 20. It would also be possible to use the same underreamer 18 attached to drill string 16, although without the drill bit 20 and the part of the drill string 16 shown below the underreamer 18 in FIG. 1, in order to enlarge a wellbore which had been drilled previously. Additionally, although the underreamer 18 and drill bit 20 are described as being connected by drill string 16, it will be appreciated that the underreamer 18 and drill bit 20 may be part of a BHA that includes drill collars, sensor tools (e.g., MWD, LWD tools), jars, heavy weight drill pipe, bypass valves, disconnect subs, or other components, rather than the same drill pipe making up the drill string 16 above the upper end of the underreamer 18.

Various aspects of the present disclosure may be embodied in a rotary tool attached to the downhole end of a drill string which extends into a wellbore from the surface as illustrated by FIG. 1. The tool may be attached to the drill string by a connector on the tool or may be within a BHA. The tool may be rotated within the conduit by a downhole motor, or in more traditional manner may be driven from the surface along with the rest of the drill string. As already mentioned, an example of tool at or near the downhole end of a drill string is a drill bit with gauge pads to contact the newly drilled wellbore wall.

The concepts of the present disclosure may also be embodied in a rotary tool incorporated into a drill string or BHA at an intermediate position between, and spaced from, the uphole and downhole ends of the drill string. Tools employed at such intermediate positions include reamers (e.g., underreamers, hole openers, etc.) as shown by FIG. 1 which enlarge a wellbore and also stabilizers which contact the wellbore wall to assist in positioning the drill string in a wellbore, section or casing mills that remove sections of installed casing, pipe cutters that cut through casing, and the like. A tool employed at an intermediate position may incorporate two connectors for attachment to the drill string above and below the tool, or may include a single connector for attachment to the drill string above the tool.

Another possibility is that a tool within the present disclosure is attached to coiled tubing which is inserted into a wellbore from the surface. The tool may be driven by a downhole motor at the downhole end of the coiled tubing, and optionally conveyed by a tractor used to convey the tool into a wellbore.

Embodiments of the present disclosure will first be illustrated by an embodiment which is a drill bit equipped with force-sensitive elements which provide one or more gauge pads to contact the wellbore wall.

Figure 2:
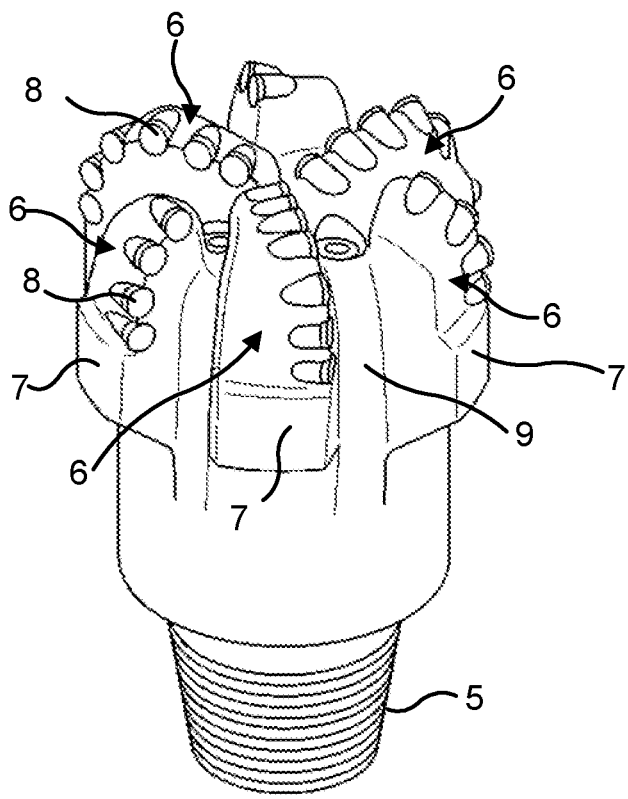
FIG. 2 is a perspective view of a fixed cutter drill bit.
Figure 4:
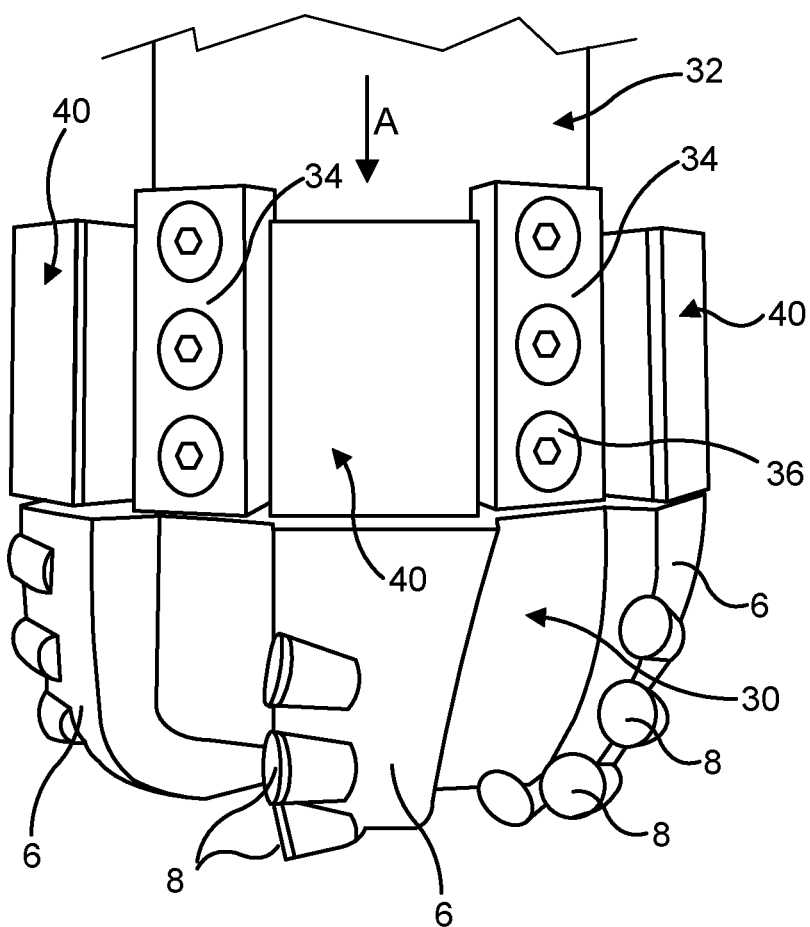
FIG. 4 is a perspective view of a fixed cutter drill bit with force-sensitive element, according to an embodiment of the present disclosure.

FIG. 4 shows a fixed cutter drill bit fitted with cutters for drilling through formations of rock to form a wellbore. This drill bit has a main bit body 30 rigidly connected to a central shank 32 which has a connector (e.g., threaded connection 5 of FIG. 2) at its uphole end for connecting to a BHA or drill string that is employed to rotate the bit and so drill the wellbore. The shank 32 is hollow to allow drilling fluid to flow down to the drill bit.

This drill bit includes blades 6 which are distributed around the bit body 30, and project radially outwardly from the bit body. The blades 6 are separated by so-called junk slots or fluid courses, which are channels allowing for the flow of drilling fluid exiting the drill bit to flow upwardly in the wellbore annulus. Cutters 8 are fitted into cavities (sometimes called pockets) in the blades 6. Example cutters 8 include so-called PDC cutters, which have particles of diamond bonded together to form a cutting face, with that diamond portion bonded to a substrate. The substrate may be formed of tungsten carbide particles which are sintered with a binder. This polycrystalline diamond portion may provide a planar or non-planar cutting face that acts as a hard-cutting surface, and which is exposed at the rotationally leading face of a blade 6. In some embodiments, additional cutters may be placed in back-up or trailing positions along the outer face of a blade, at a position that is offset from the leading face of the blade 6.

Figure 6:
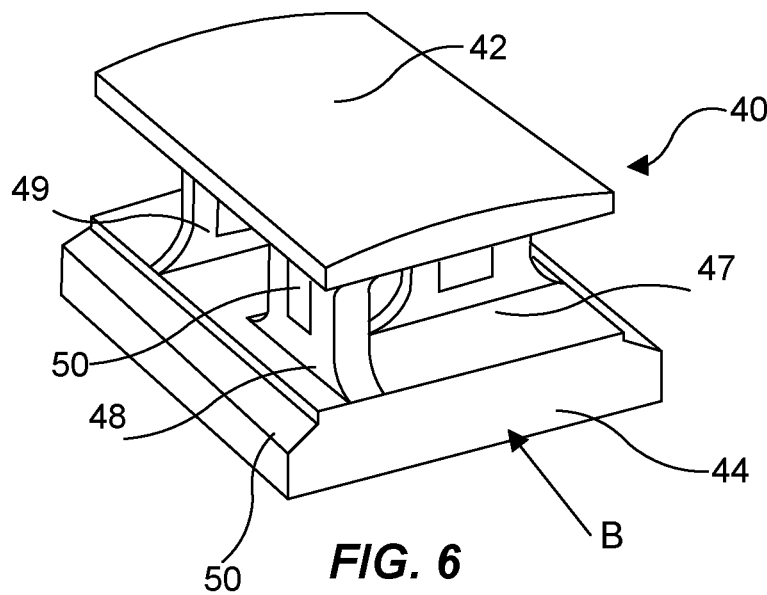
FIG. 6 is a perspective view of a force-sensitive element without a protective skirt attached, according to an embodiment.
Figure 7:
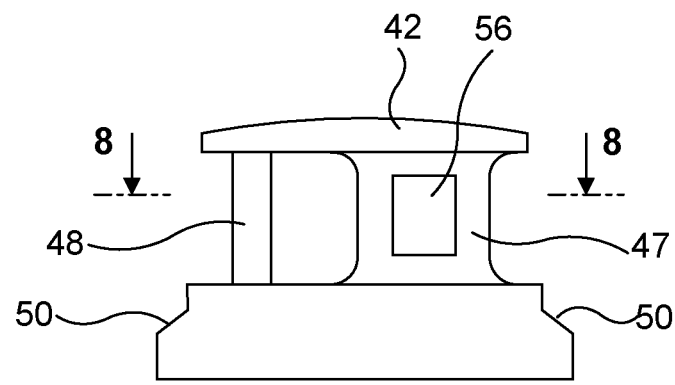
FIG. 7 is an end view of the force-sensitive element, seen in the direction of arrow B of FIGS. 6 and 8.
Figure 8:
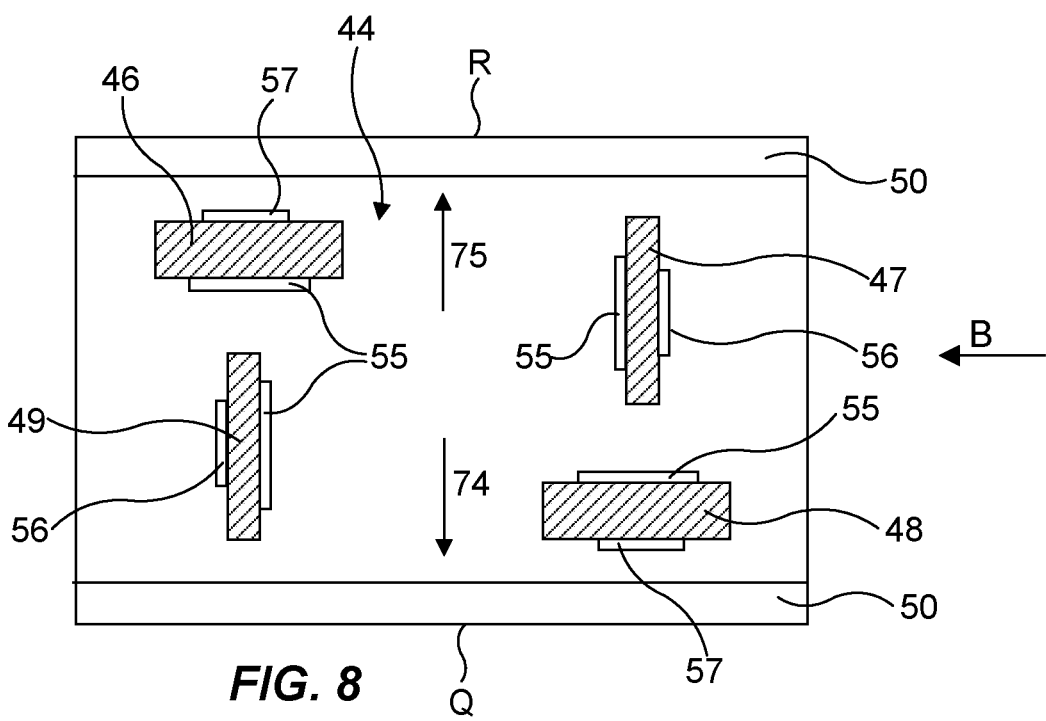
FIG. 8 is a sectional view on line 8-8 of FIG. 7.

In the illustrated embodiment, force-sensitive elements 40 are attached to the shank 32 of the drill bit. As shown in FIGS. 6, 7, and 8, the force-sensitive element 40 includes an outer portion 42, a base or attachment portion 44 which is opposite the outer portion 42, and a plurality of connecting portions 46-49 rigidly connected to both the outer portion 42 and the attachment portion 44. For instance, in the illustrated embodiment, four connecting portions 46-49 extend from the outer surface of the attachment portion 44 and radially outwardly toward an inner surface of the outer portion 42, although more or fewer than four connecting portions may be used. Indeed, in some embodiments, a single connecting portion may be used. In this embodiment, the attachment portion 44 also has a projecting lip 50 along one or more edges. In FIGS. 6 and 7, for instance, the longer edges (which may be the circumferential edges as shown in FIG. 5), may include the projecting lip 50.

The parts 42, 44, and 46-49 of a force-sensitive element 40 may be made as a one-piece article by computerized numerical control (CNC) machining from a block (e.g., a metal block such as steel, titanium, etc.), or in a casting process that optionally includes machining to desired tolerances after casing. Another possibility is to make the article as one piece by an additive manufacturing process. Such a process may include selectively depositing material in each layer and/or selectively binding material in each layer, in accordance with a design stored in digital form. Such processes are known by various names including rapid prototyping, layered manufacturing, solid free-form fabrication, and 3D printing. Example additive processes which may for instance be used include the selective laser or electron beam sintering of a powder, which may be steel, titanium, Inconel, or even tungsten carbide powder. In that process, layers of powder may be deposited one on top of another on a build platform. During deposition of a layer, or after each layer of powder is deposited, the regions to be bound together are sintered by a laser beam or an electron beam.

The force sensitive elements 40 could also be made as two parts, either by machining, casting, or additive manufacturing, and then joined together (and of course one part could be made by machining or casting and another part by additive manufacturing). For instance, the outer portion 42 together with the four connecting portions 46-49 could be made as one piece and then joined to the attachment portion 44 by electron beam welding or laser welding.

Figure 5:
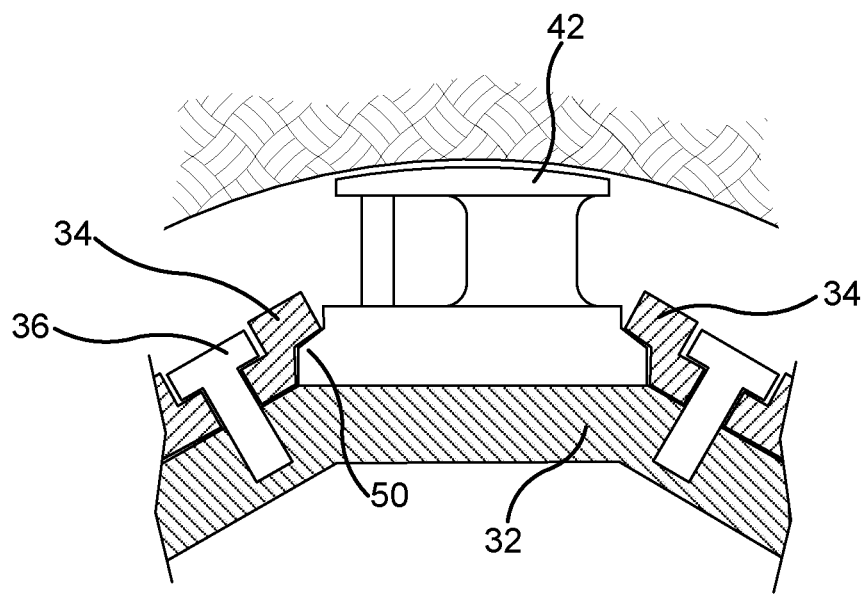
FIG. 5 is a view in the direction of arrow A of FIG. 4 onto the end of a force-sensitive element on the drill bit, when the force-sensitive element is in contact with a conduit wall.

As shown in FIGS. 4 and 5, the force-sensitive elements 40 can attached to the shank 32 by elements 34 which are shown in the form of bars, and which are optionally held to the shank 32 by mechanical fasteners such as bolts 36. In the illustrated embodiment, the outer surface of the shank 32 has a polygonal shape with flat surfaces that engage a flat, radially inner surface of the attachment portion 44 and flat, radially inner surfaces of the bars 34. The bars 34, as shown in FIG. 5, overlap the lips 50 of attachment portions 44 and press the attachment portion 44 radially inwardly onto faces of the polygonal shank 32, thus clamping the force-sensitive elements 40 in place. The force-sensitive elements 40 are optionally circumferentially aligned with the blades 6 (e.g., as extensions of the blades) and the channels between the blades 6 can continue as between force-sensitive elements 40. While the shank 32 may have a polygonal outer surface, in other embodiments the outer surface is cylindrical, and the inner surfaces of the bars 34 and attachment portion 44 may be curved to correspond to the cylindrical surface of the shank 32.

As best seen in FIGS. 5-7, the outer surface of the outer portion 42 of each force-sensitive element 40 is optionally a curved surface that forms a part cylindrical outer surface with a radius which is the same as, or about the same as, the radius cut by the outermost cutters 8 on the bit body 30. The outer portions 42 of the force-sensitive element thus constitute gauge pads which make sliding contact with the wall of the wellbore as it is drilled, as seen in FIG. 5, and thereby position or stabilize the drill bit in the wellbore.

Referring to FIG. 8, an optional layout of the connecting portions 46-49 is shown. In this embodiment, the connecting portions 47 and 49 extend parallel to the shorter edges of the outer portion 42 and attachment portion 44. In this embodiment, the shorter edges of the outer portion 42 and attachment portion 44 are on the uphole and downhole ends of the force sensitive element 40, so the connecting portions 47 and 49 extend circumferentially relative to the drill bit axis. The connecting portions 46 and 48, which are optionally thicker than the connecting portions 46 and 48, are parallel to the longer edges of the outer portion 42 (i.e., circumferential edges in this embodiment), and so run parallel to the axis of the drill bit. It is apparent from the drawings that the four connecting portions 46-49 taken together have a total cross-sectional area (transverse to imaginary radii from the tool axis and so facing the conduit wall as does the outer portion) which is less than the area of the outer surface of the outer portion 42 (e.g., contacting the wellbore) and likewise less than the area of the inner surface of the attachment portion 44 (e.g., contacting the shank 32). In some embodiments, the total cross-sectional area is much less than the area of the outer surface of the outer portion 42 and the area of the inner surface of the attachment portion 44, and is within a range including a lower limit, an upper limit, or lower and upper limits including any of 5%, 10%, 20%, 30$, 40%, or 50% of the area of the outer surface of the outer portion 42, the area of the inner surface of the attachment portion 44, or both.

With a reduced cross-sectional area, the connecting portions 46-49 can be more compliant than the outer portion 42 and the attachment portion 44. In use, forces acting on the outer portion 42, relative to the main structure of the drill bit, can cause elastic strains (also referred to as elastic distortions) of these connecting portions 46-49. In order to measure such strains and hence measure the forces causing the strains, strain gauges 55,56, and 57 (e.g., electrical resistance strain gauges) can be attached to the connecting portions 46-49. For instance, the strain gauges 55-57 can be attached to flat surfaces of the connecting portions 46-49. As seen in FIG. 7, strain gauges (e.g., strain gauge 56) can be extend between, and be radially offset from one or both of the outer portion 42 and the attachment portion 44. As explained in more detail herein, strain gauges 55 can be used to measure radial forces while optionally excluding circumferential and axial forces. The strain gauges 56 are optionally responsive to circumferential forces only and the other strain gauges 57 are optionally responsive to axial forces only. It should also be appreciated that increased compliance of one or more connecting portions 46-49 can be produced in other ways, besides having reduced cross-sectional areas. For instance, the connecting portions 46-49 may be formed of a different, and more compliant material. For instance, the connecting portions 46-49 may be formed of a steel material that is more flexible than a different steel material used for the outer portion 42 and/or attachment portion 44.

The various gauges used in this example embodiment can each observe strain by means of an electrically conductive but somewhat resistive path deposited on a piece of thin electrically insulating polymer sheet referred to herein as a carrier. The carrier may be adhered to a face of a connecting portion to be observed. If stress causes an area of the connecting portion to which a strain gauge is adhered to stretch slightly, the carrier and the conductive path also lengthen and the resistance of the conductive path increases. Conversely, if the conductive path is shortened, its resistance decreases. Such strain gauges of this type are available from numerous manufacturers and component suppliers including HBM Inc. in Marlborough, Mass., USA, HBM United Kingdom Ltd in Harrow, UK, and National Instruments in Newbury, UK and Austin, Tex., USA. Adhesives for attaching strain gauges to steel are available from manufacturers of strain gauges and may be a two-part epoxy adhesive.

Each of the strain gauges 55-57 can include, in some embodiments, a pair of gauges in proximity to each other on a single carrier. The conductive path of one individual gauge can run perpendicular to the conductive path of the proximate gauge. Such pairing of gauges can incorporate compensation for temperature variation by orienting the gauges so that only one gauge of the pair is subject to strain to be measured while both of them are exposed to the surrounding temperature. Multiple strain gauges may be used in combination to enable one strain in a system to be measured separately from another.

Figure 9:
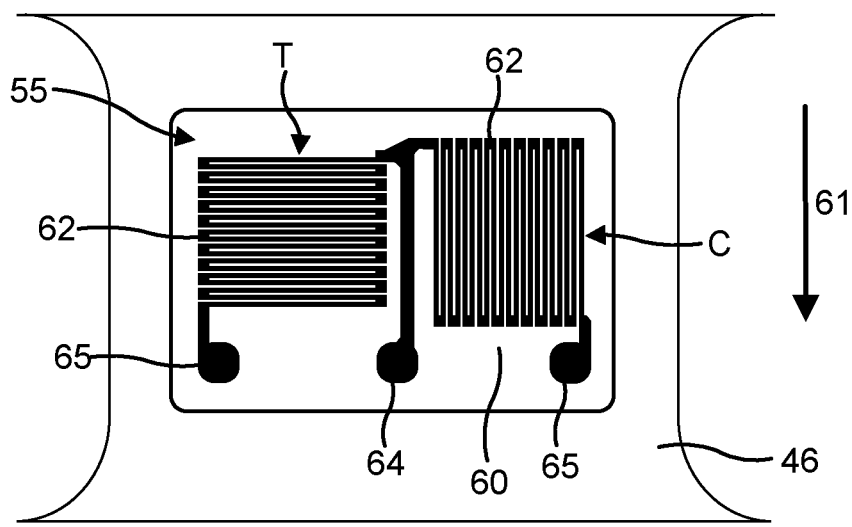
FIG. 9 shows a Poisson gauge coupled to a flat face of a connecting portion, according to an embodiment.

FIG. 9 is an enlarged view of a gauge 55 which includes a pair of individual strain gauges having conductive paths deposited on, or otherwise applied to, a single carrier 60. The carrier 60 may be coupled to a connecting portion such as 46. In the region C, which is to the right as shown, a strain gauge is provided by a conductive path which extends to and fro many times parallel to the radial direction indicated by the arrow 61. This provides a length of conductive path which is subject to strain when the underlying connecting portion undergoes strain in the direction of the arrow 61. If the strain shortens the carrier 60 in the direction of the arrow 61, it will correspondingly shorten the conductive path in the region C in the same direction, causing a decrease in resistance of the conductive path. Conversely, if there is strain which elongates the conductive path in region C, the resistance of the conductive path increases. The reverse turns 62 in the conductive path are thickened as shown to reduce resistance in those parts of the path which are transverse/perpendicular to the direction of arrow 61.

In the region T, a second gauge is provided by a conductive path running to and fro transverse/perpendicular to the arrow 61. The resistance of the conductive path in this region T is not affected by strain parallel to the arrow 61. The conductive paths in regions C and T are connected to each other and to a solder tab 64 on the supporting carrier 60. The other ends of these two conductive paths are connected to separate solder tabs 65. A strain gauge 55 of the kind shown in FIG. 9 is sometimes referred to as a Poisson gauge.

If the outer portion 42 is subjected to a radial force in a direction toward the tool axis, the four connecting portions 46-49 will be compressed slightly. To measure this compressive strain, and hence measure radial force, a Poisson gauge 55 of the type shown by FIG. 9 is attached to each of the connecting portions 46-49 as indicated in FIG. 8. On each connecting portion the Poisson gauge 55 provides a gauge as indicated at C of FIG. 9 with conductive path running in the direction of compressive strain resulting from radial force which is indicated by arrow 61. These gauges will be referred to as gauges 46C-49C. The Poisson gauge 55 on each connecting portion provides a gauge as indicated at T of FIG. 9 with a conductive path transverse/perpendicular to the direction of arrow 61. These will be referred to as gauges 46T-49T.

A Wheatstone bridge circuit can be used to measure the change in resistance of strain gauges, and multiple gauges can be used in a Wheatstone bridge to separate strains and the forces separating them into different parts.

Figure 10:
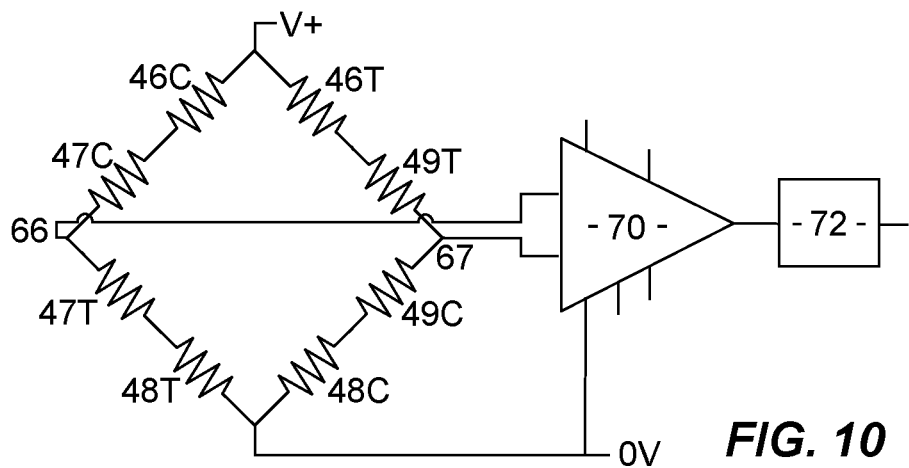
FIG. 10 is a circuit diagram showing connection of Poisson gauges of a force-sensitive element, according to an embodiment.

In some embodiments, the four Poisson gauges 55 are connected to each other, but are not connected to any of the gauges 56, 57. The circuit diagram of FIG. 10 shows how the individual strain gauges 46C-49C and 46T-49T are connected in a Wheatstone bridge circuit with two gauges in each arm of the bridge. A fixed supply voltage V+is connected to the solder tab 64 of the Poisson gauge on connecting portion 46 and ground (0V) is connected to the solder tab 64 of the Poisson gauge on connecting portion 48. The solder tabs 64 of the Poisson gauges on connecting portions 47 and 49 are outputs 66 and 67 from the Wheatstone bridge and these are connected as inputs to a differential amplifier 70. The solder tabs 65 on the four Poisson gauges are used for connections between the individual gauges in each arm of the Wheatstone bridge.

When radial force on the outer portion 42 compresses the four connecting portions and the carrier 60 of the Poisson gauge 55 on each connecting portion in the direction indicated by arrow 61, this shortens the conductive paths of gauges 46C-49C and reduces their resistance. The gauges 46T-49T are not affected. Consequently, the potential of output 66 from the Wheatstone bridge increases and the potential of output 67 decreases. The resulting change in potential difference between 66 and 67 is amplified by a differential amplifier 70 and is a measurement of radial compressive strain and hence of radial force. Any change in the temperature of the gauges will affect their resistance, but so long as this affects all gauges 46C-49C and 46T-49T equally, changes in temperature do not cause a change in the voltage difference between 66 and 67 and in the output from the amplifier 70. Output from the differential amplifier 70 may be converted to digital form by an analog to digital converter 72. Electronic components such as the differential amplifier 70 and analog to digital converter 72 may be part of an electronics package contained within the bottom hole assembly at the downhole end of a drill string, for instance in measuring-while-drilling (MWD) equipment located in the drill string close to the drill bit, and operating to read the strain gauges and optionally transmit information to the surface using mud pulse telemetry, wired drill pipe, or the like.

Figure 11:
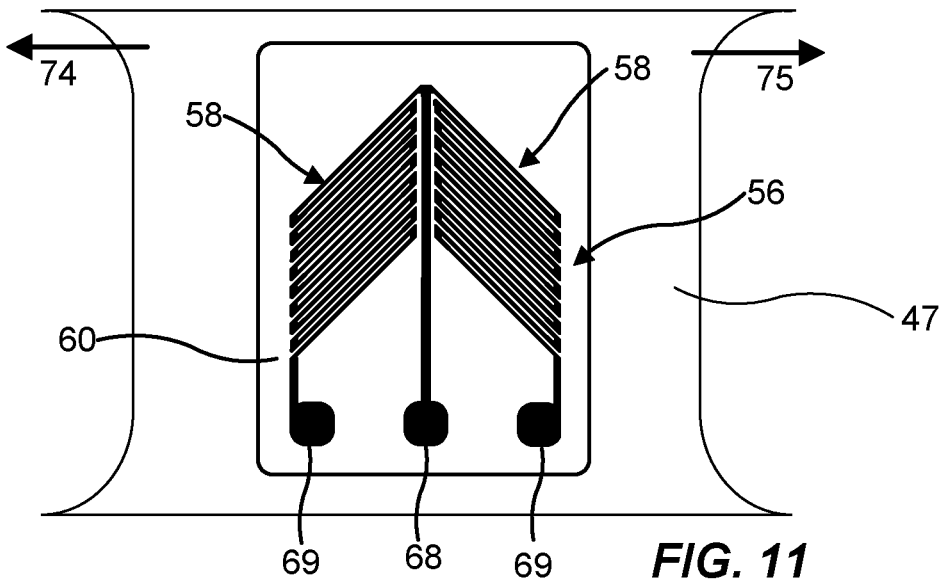
FIG. 11 shows a chevron gauge coupled to a flat face of a connecting portion, according to an embodiment.

FIG. 11 is an enlarged view of a strain gauge 56 on connecting portion 47. This gauge 56 includes a pair of individual strain gauges provided by conductive paths connected on a single carrier 60. The conductive paths 58 in regions at the left and right of FIG. 11 are perpendicular to each other although both are diagonal relative to the edges of the carrier 60 and the edges of the connecting portion 47 (e.g., axial and radial edges). The two gauges are connected to a common solder tab 68 while the other ends of the two conductive paths are connected to respective solder tabs 69. A gauge 56 including a pair of gauges with configuration shown in FIG. 11 is commonly referred to as a chevron gauge. The gauges 57 can include chevron gauges of this type.

The chevron gauges 56 on the connecting portions 47 and 49 may be oriented so that circumferential force on the outer portion 42 (i.e., force acting in a circumferential direction relative to the tool axis and therefore tangential to the direction of rotation) will act in the direction of the arrow 74 or the opposite arrow 75. Force in the direction of arrow 74 causes shear strain of the connecting portions 47, 49 and the attached chevron gauges 56, so that the conductive path 58 of one gauge 56 will lengthen and the other will shorten. In the case of the connecting portion 47 shown in FIG. 11, force in the direction of arrow 74 will lengthen the conductive path 58 at the right and its resistance will increase while the conductive path 58 at the left will shorten and its resistance will decrease.

Figure 12:
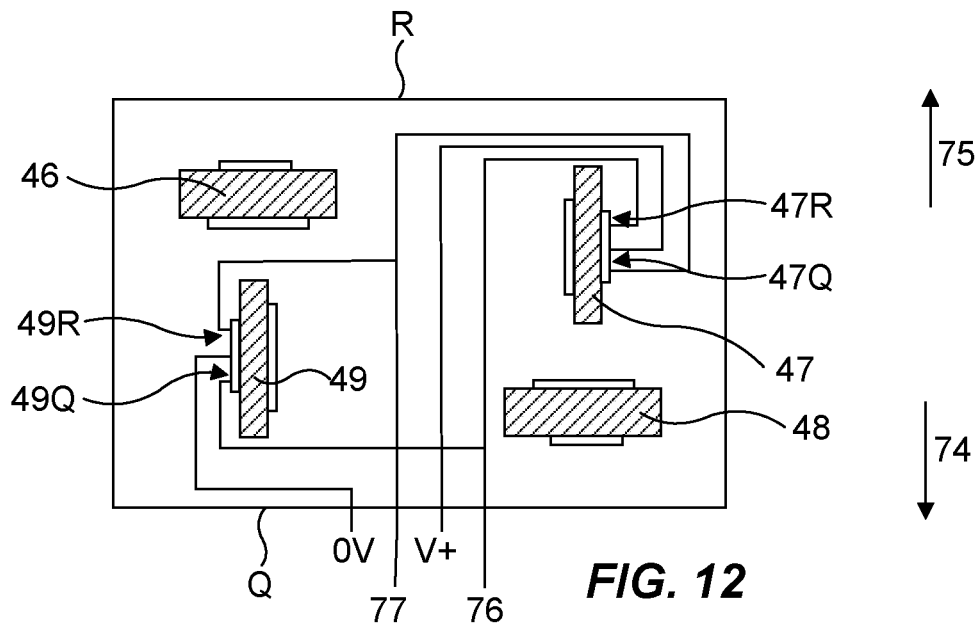
FIG. 12 shows connections between four chevron gauges of a force-sensitive element, according to an embodiment.
Figure 13:
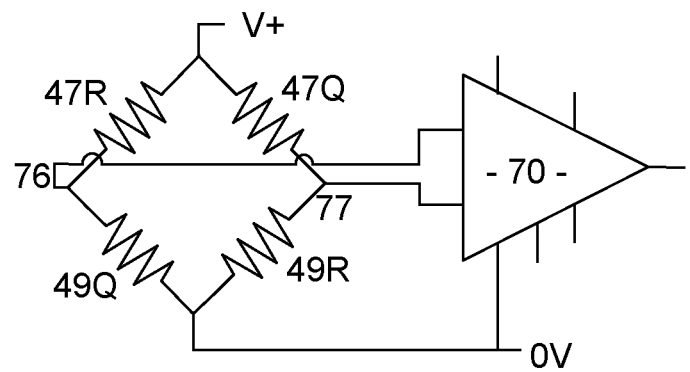
FIG. 13 is a circuit diagram corresponding to the force-sensitive element of FIG. 12.

FIGS. 12 and 13 show how two chevron gauges on connecting portions 47 and 49 can be used to measure strain resulting from circumferential force(s). The individual strain gauge (i.e. conductive path 58) at the left of FIG. 11 can be positioned on connecting portion 47 nearer to the longitudinal edge Q of the force-sensitive element 40 than to the opposite edge R, and this gauge appears as resistance 47Q in the circuit diagram shown as FIG. 13. The other individual gauges on connecting portions 47 and 49 appear as 47R, 49Q, and 49R in FIGS. 12 and 13 according to whether they are at the chevron gauge edge which is nearer to longitudinal edge Q or R. These individual gauges are connected into a Wheatstone bridge as shown in FIG. 13. Outputs 76 and 77 from the Wheatstone bridge are inputs to a differential amplifier 70. Circumferential force in the direction of arrow 74 will produce shear strain in connecting portions 47 and 49, shortening the conductive paths of individual gauges 47Q and 49Q while stretching 47R and 49R. This will increase the voltage at 77 and reduce the voltage at 76, thus changing the voltage difference between 77 and 76. This change is amplified by a differential amplifier 70. Output from this amplifier 70 may be converted to digital form by an analog to digital converter 72. Circumferential force in the opposite direction, indicated by arrow 75 in FIGS. 8 and 11 will give opposite effects reducing the voltage at 77 relative to 76.

Gauges 56 may be positioned to respond to circumferential forces which cause shear strain, and not to respond to axial forces on the outer portion 42. In some embodiments, radial force transmitted to a gauge 56 or a change in temperature will not produce a response because it will affect the its two conductive paths 58 equally and the voltage difference between 76 and 77 will stay substantially unchanged.

The gauges 57 on the connecting portions 46 and 48 can also be chevron gauges of the type shown in FIG. 11. Shear strain of these connecting portions 46 and 48, resulting from force acting on the outer portion 42 in the axial direction, may be detected by the chevron gauges 57 which are connected into a Wheatstone bridge circuit in a manner directly analogous to that shown in FIGS. 12 and 13.

Overall, the described configuration of Poisson gauges 55 and chevron gauges 56, 57 on connecting portions 46-49 which extend axially and circumferentially is able to separate components of force acting radially, circumferentially, and axially on the outer portion 42. Circumferential force on the outer portion 42 will produce shear strain in the connecting portions 47 and 49 which will be detected and measured as described, but will not apply shear strain to the connecting portions 46 and 48 in any direction affecting the chevron gauges 56, 57 on these two connecting portions. Conversely, axial forces on the outer portion 42 will be measured by chevron gauges on connecting portions 46 and 48 but will not apply shear strain to the connecting portions 47 and 49. Thus, measurements of circumferential and axial forces are separated from each other, and from radial forces. In the case of the connecting portions 47 and 49, radial force will compress the two gauges 58 on the connecting portions equally and so the changes in resistance will be the same in each of four arms of the Wheatstone bridge of FIG. 13 and there will be no change in voltage difference between its outputs 67 and 68. In a directly analogous manner, there will be no change in output from the Wheatstone bridge made up by the chevron gauges on connecting portions 46 and 48 when these are subjected to radial force. Thus, the chevron gauges 56, 57 exclude radial force and give separate measurements of circumferential and axial forces.

The configuration of the Poisson gauges 55 enables them to exclude axial and circumferential forces. Shear strain of the connecting portions 47 and 49 by circumferential force and likewise shear strain of the connecting portions 46 and 48 by axial force will have little or no effect on the resistances within the Poisson gauges on these connecting portions.

Figure 14:
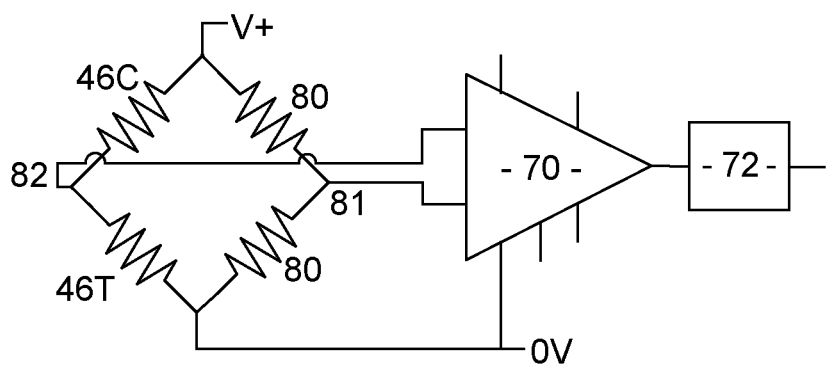
FIG. 14 is a circuit diagram showing an alternative arrangement of one Poisson gauge of a force-sensitive element, according to an embodiment.

Connecting the Poisson gauges 55 into one Wheatstone bridge as shown in FIG. 10 combines measurements from the individual gauges so as to give a measurement of overall radial force on the outer portion 42 of the force-sensitive element 40. FIG. 14 shows a different approach which enables individual measurement of radial force through each of the connecting portions 46-49. The Poisson gauges 55 are connected in four, individual Wheatstone bridge circuits. FIG. 14 shows the Wheatstone bridge for the Poisson gauge 55 on connecting portion 46. The individual gauges 46C and 46T are in different arms of the bridge. The other two arms of the bridge are provided by resistors 80 which are mounted close together on a circuit board so that they are exposed to the same temperature and their connection at 81 is at the same potential. The outputs at 81 and 82 from this Wheatstone bridge are connected to a differential amplifier 70 and the output from the differential amplifier is converted to digital form by an analog to digital converter 72.

Radial force which causes compressive strain of the connecting portion 46 will affect the gauge 46C but not the gauge 46T and so will change the potential of the output 82 of the Wheatstone bridge. This is amplified by the differential amplifier 70 and is a measure of radial force compressing the individual connecting portion 46. The other three Poisson gauges 55 are connected in similar Wheatstone bridge circuits to the one shown in FIG. 14. The digital outputs from each of the Wheatstone bridge circuits can be transmitted to a computing device or processor, which processes the digital information to determine overall radial force on the outer portion and also the magnitude of radial force acting on each of the four connecting portions 46-49. It is thus possible to observe the position at which radial force acts on the force-sensitive element and to particularly observe whether radial force on the end of the force-sensitive element nearer the downhole end (i.e., face) of the drill bit is greater than radial force on its opposite end further from the cutting tip (e.g., toward the shank).

Figure 15:
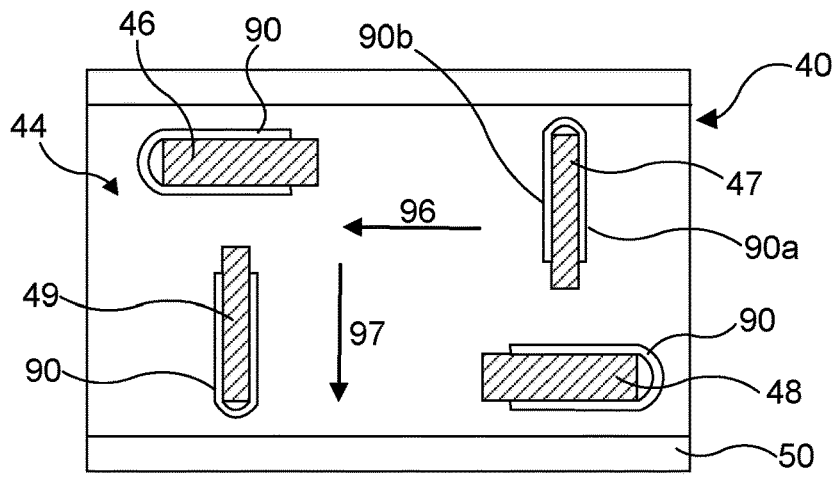
FIG. 15 shows a gauge in a view similar to the view of FIG. 9, with additional provision for separation of forces acting on it, according to an embodiment.
Figure 16:
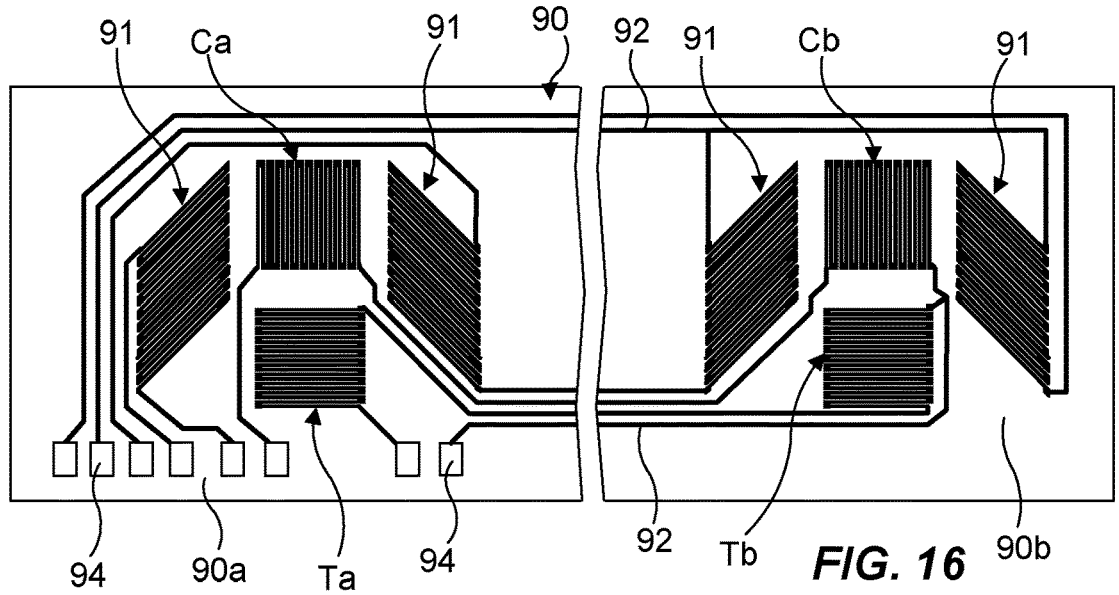
FIG. 16 is an enlarged view of a carrier used in the embodiment of FIG. 15, according to an embodiment.

FIGS. 15 to 20 show an embodiment of force-sensitive element with additional provision for separation of forces acting on it. The structure of the connecting portion 44 and force-sensitive element 40 may be the same as described with reference to FIGS. 4 to 8, and the same reference numerals are used. A carrier 90 on which individual strain gauges have been deposited or otherwise positioned is attached to each of the connecting portions 46-49. As above, each individual strain gauge provides a conductive path on the carrier which extends to and fro various times. The enlarged view of a carrier 90 and gauges at FIG. 16 shows an example embodiment in which there are eight individual gauges on the carrier 90, arranged in two groups of four with connections 92 between the groups and connections to solder tabs 94, although more or fewer individual gauges may be used in other embodiments.

Figure 17:
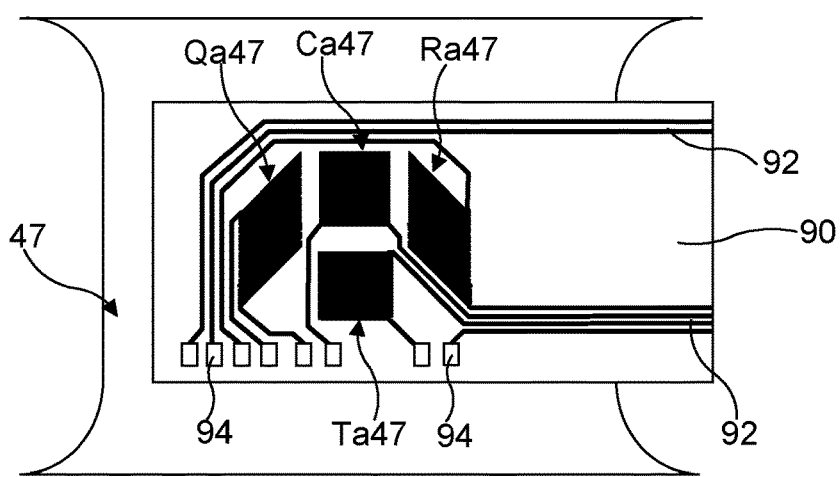
FIG. 17 is a view of a carrier adhered to one face of a connecting portion, according to an embodiment.

Each carrier 90 may be wrapped or folded around one of the connecting portions 46-49 as shown in FIG. 15, so that portions 90a and 90b of the carrier 90—which each bear four individual gauges—are adhered or otherwise coupled to the two broad faces of the connecting portion. As an illustration of this, FIG. 17 shows portion 90a as at the left of FIG. 16, bearing four individual gauges and coupled to one face of connecting portion 47 (e.g., a face having an axial length and a radial height).

As shown by FIG. 16, each group of four individual gauges includes individual gauges C and T which operate as a Poisson gauge similar to the Poisson gauge shown in FIG. 9, and two further gauges 91 which together function as a chevron gauge similar to the gauge shown in FIG. 11.

Figure 18:
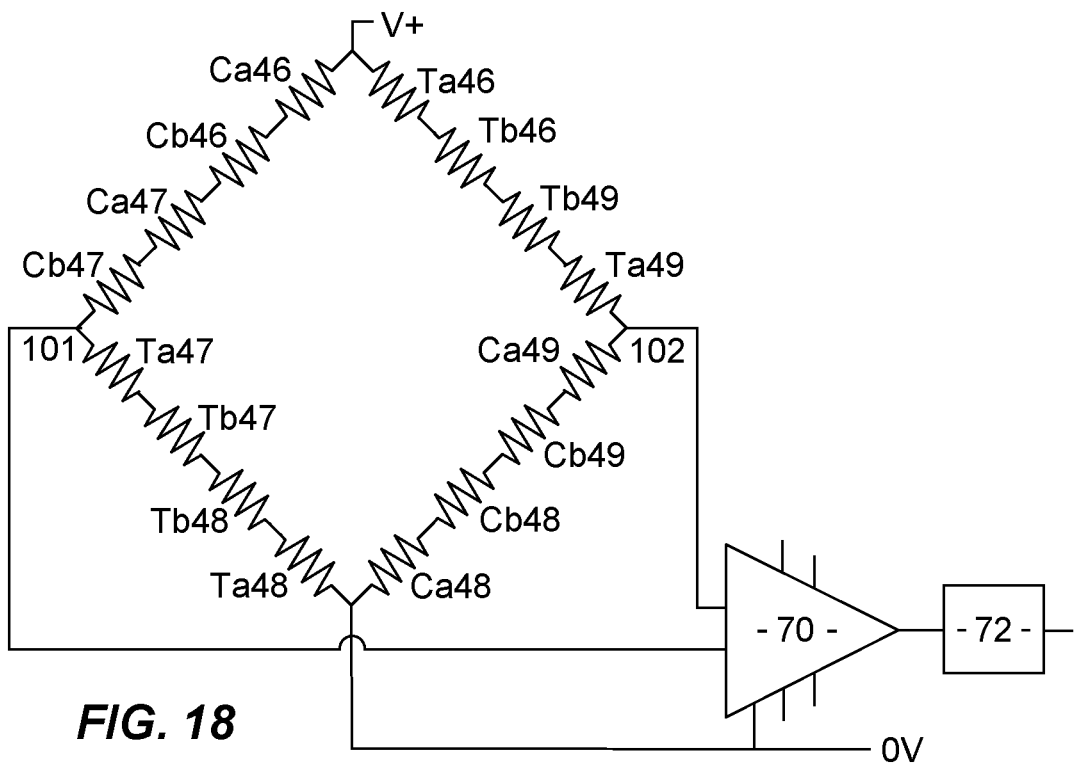
FIGS. 18 to 20 are circuit diagrams for the embodiment of FIG. 15, according to an embodiment.
Figure 19:
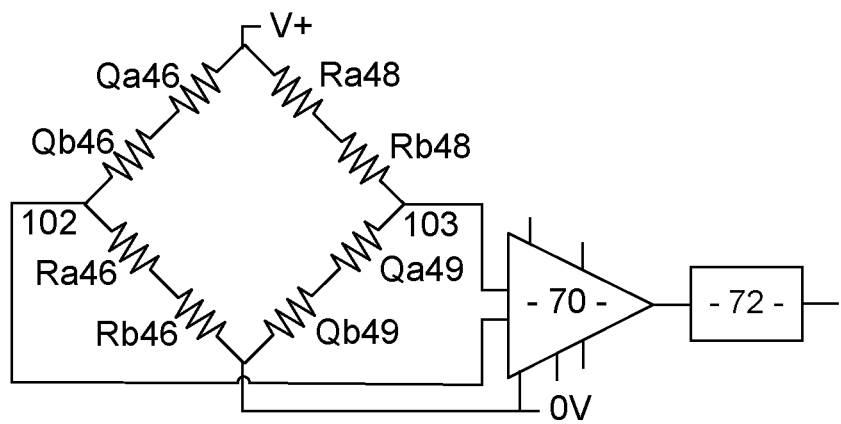
Figure 20:
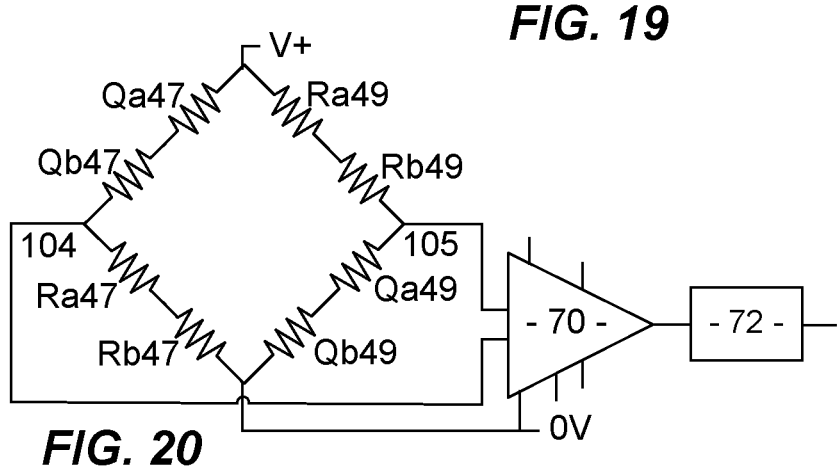

In the following description of circuitry, the gauge C on portion 90a of the carrier coupled to connecting portion 46 is designated as gauge Ca46. Corresponding designations are used for the other individual gauges. The individual C and T gauges which form Poisson gauges are each connected in a Wheatstone bridge circuit as shown by FIG. 18. The C gauges on connecting portions 46 and 47 are connected in series in one arm of the bridge. The C gauges on connecting portions 48 and 49 are connected in series in the opposite arm of the Wheatstone bridge. The gauges 91 on the connecting portions 46 and 48, which respond to axial force components parallel to the arrow 96 shown in FIG. 15, are connected in a separate Wheatstone bridge circuit shown in FIG. 19. The gauges 91 on the connecting portions 47 and 49, which respond to circumferential force components parallel to the arrow 97, are connected in a third Wheatstone bridge circuit shown in FIG. 20. Gauges 91 which are shortened by force components in the direction of arrow 96 or arrow 97 appear in FIGS. 19 and 20 as resistances Q, while gauges which are lengthened by force components in the direction of arrows 96 or 97 appear as resistances R.

Although this embodiment has more individual gauges than the embodiment shown in FIGS. 7 to 14, forces on the outer portion 42 of the force-sensitive element are separated into radial, axial, and circumferential components in the same manner as in the embodiment of FIGS. 7 to 14. Radial force shortens the conductive parts of gauges C without affecting the gauges T, leading to a change in potential difference between outputs at points 101 and 102. Radial force affects the two individual (i.e., Q and R) gauges of a chevron gauge equally, and so does not alter the potential difference between points 103 and 104 nor between 105 and 106 of the circuits shown in FIGS. 19 and 20. Axial force in the direction shown by arrow 96 in FIG. 15 will stretch the Q gauges and compress the R gauges on connecting portions 46 and 48, leading to a change in potential between the outputs at points 103 and 104. Similarly, circumferential force in the direction shown by arrow 97 will stretch the Q gauges and compress the R gauges on connecting portions 47 and 49, thereby leading to a change in potential between the outputs at points 105 and 106. When axial or circumferential forces cause shear strain of a connecting portion the shear strain does not lengthen or shorten the C and T gauges subjected to the shear strain.

The provision of four individual gauges C, T, Q, and R on both faces of each connecting portion 46-49 serves to exclude effects arising from bending strain of the connecting portions. For instance, circumferential force acting in the direction of arrow 96 (observed by shear strain of connecting portions 47 and 49) will cause bending of the two connecting portions 46 and 48, leading to stretching of Q, R, and T gauges on one face of each of these two connecting portions and compression of the Q, R, and T gauges on the opposite face. However, it can be seen from FIGS. 18 to 20 that each of the four individual gauges of portion 90a on one face of a connecting portion is connected in series with the corresponding gauge of portion 90b. For instance, Ta46 and Tb46 are in series and in one arm of a Wheatstone bridge shown in FIG. 18. Qa46 and Qb46 are in series in one arm of the Wheatstone bridge shown in FIG. 19.

Bending of one or more connecting portions may result from axial or circumferential shear forces or from radial force which is not central on the outer portion 42 of a force sensitive element. Regardless of cause, when there is bending strain of any connecting portion, the stretching of any gauge on one face of that connecting portion is compensated by compression of the corresponding gauge on the opposite face of the same connecting portion so that the total resistance of the two gauges which are connected in series remains the same, and bending strain of connecting portions is eliminated from the measured data.

Figure 21:
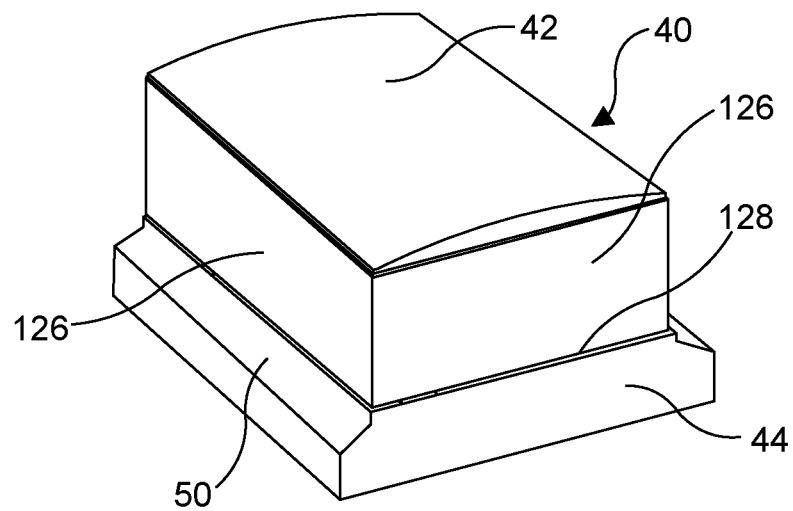
FIG. 21 is a perspective view of a force-sensitive element similar to that of FIG. 6, after attaching a protective skirt, according to an embodiment.

Referring to FIG. 21, after the structure of a force-sensitive element 40 similar to that shown in FIG. 6 has been made and equipped with strain gauges 55, 56, 57 as shown in FIG. 8 or equipped with strain gauges on carriers 90 as shown in FIG. 15, and also equipped with wiring for electrical connections to an electronics package, a protective skirt 126 can be attached to the force-sensitive element. The skirt 126 can be made of sheet metal, machined metal, multiple components, or the like, and coupled to the sides of the outer portion 42 (or optionally to the attachment portion 44) in any suitable manner, such as by electron beam welding. This skirt 126 may be dimensioned such that its radially inner edge 128 is close to, but slightly spaced from, the attachment portion 44. Consequently, force on the outer portion 42 can strain the connecting portions 46-49 without being impeded by contact between the skirt 126 and the attachment portion 44. The converse can also be done, where the radially outer edge can be close to, but slightly spaced from, the outer portion 42. The volume inside the skirt 126, between the outer and attachment portions 42, 44 may be filled with electrically insulating flexible filler material which can include an organic polymer. The flexible filler material can be more deformable than the connecting portions 46-49. In some embodiments, the flexible filler material includes a silicone polymer or a polyurethane polymer, and it may be pumped in as a liquid which then cures in place. This filler material may be a continuous mass of polymer or it may be a closed cell foam so that, in either case, drilling fluid is restricted and possibly prevented from entering the space filled with filler material. The skirt 126 and the filler material can protect the strain gauges from abrasion by the flow of drilling fluid and entrained drill cuttings without affecting measurements by the strain gauges.

Force-sensitive elements disclosed herein are generally provided with protective skirts and filling but, to assist explanation of the component parts and sensors, skirts and polymer filling are omitted from many of the drawings.

Figure 22:
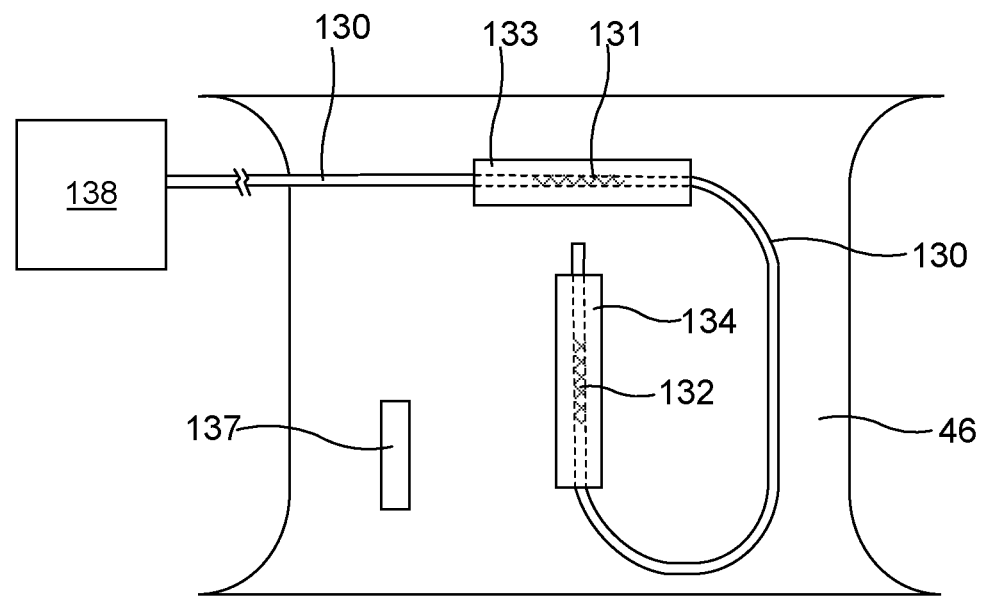
FIG. 22 shows fiber Bragg sensors coupled to a flat face of a connecting portion, according to an embodiment.

Other types of sensors could be used on connecting portions 46-49 in place of the electrical strain gauges described above. One possibility illustrated by FIG. 22 is optical sensors based on fiber Bragg gratings. A Bragg grating is formed in optical fiber by creating systematic variation of reflective index within a short length of the fiber. The grating selectively reflects light of a specific wavelength which is dependent on the spacing of the grating. Strain of the fiber alters the spacing of the grating and so alters the wavelength at which reflection by the grating is at a maximum because there is maximum constructive interference.

Patent literature on the creation of Bragg gratings by means of ultraviolet light to irradiate a photosensitive optical fiber includes U.S. Pat. Nos. 5,956,442 and 5,309,260 along with documents referred to therein, each of which are incorporated herein by this reference. Strain sensors based on Bragg grating in optical fiber are available from a number of suppliers including HBM and National Instruments.

FIG. 22 shows a connecting portion 46, which is shaped as shown in FIGS. 5 to 7, but differs in that it is fitted with two fiber Bragg sensors instead of electrical resistance strain gauges. The two sensors are formed in a single optical fiber 130. Regions with systematic refractive index variations are formed at 131 and 132. Portions of fiber containing these regions are adhered within flat substrates 133 and 134 respectively. Both of these substrates are adhered or otherwise coupled to the connecting portion 46 which is oriented such that sensors on it are not responsive to circumferential force on the outer portion 42. The substrate 133 containing grating 131 is positioned perpendicular to the radial direction (e.g., in an axial direction) so as to be responsive to strain caused by axial forces but not by radial force while the substrate 134 containing grating 132 is positioned in the radial direction so as to be responsive to radial force but not axial force.

In use, the optical fiber 130 is optionally coupled to an interrogating device indicated schematically at 138, which directs light of varying wavelengths along the fiber 130, receives the reflection, and determines the wavelength at which reflectance is greatest. Observed changes in this wavelength are proportional to the strain and in turn proportional to the force causing strain of the connecting portion. The gratings 131 and 132 are made with different spacings so that they reflect different wavelengths. Consequently, both can be interrogated by the same device 138 transmitting and receiving light along the common optical fiber.

The output from the interrogating device 138 may be in digital form and may be processed by a computer/processor to give measurements of strain and hence of force on the outer portion 42. The Bragg gratings are sensitive to temperature as well as strain. Consequently, a thermistor or other temperature sensor is attached to the connecting portion 46 as indicated at 137 and processing the outputs from the interrogating device 138 includes correction for the effects of temperature.

Fiber Bragg sensors may be provided on both of the connecting portions 46, 48 to measure axial and radial forces on outer portion 42. Fiber Bragg sensors may also be provided on any or all of the connection portions 46-49 (e.g., on connecting portions 47 and 49) to measure strain of these connecting portions by circumferential and radial forces.

Another technology which may possibly be used for strain sensors on the connecting portions 46-49 is piezoresistive sensors, which are also known as "semiconductor strain gauges". Such sensors have an electrically conductive path which includes a semiconducting material. The electrical resistance of this material is affected by strain of the material causing a change of interatomic-spacing within the semiconductor. The change in resistance in response to strain is greater than with electrical resistance sensors. Suppliers of such gauges include Micron Instruments in Simi Valley, Calif., USA and Kulite Semiconductor Products Inc. in New Jersey, USA.

Figure 23:
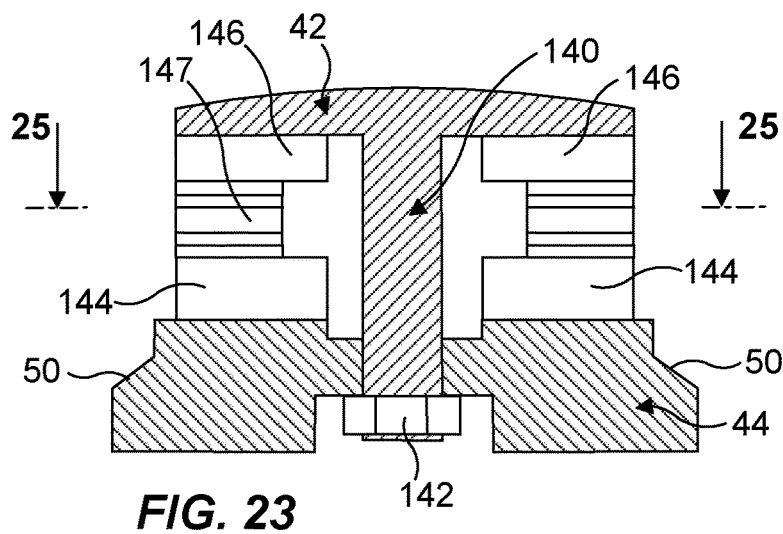
FIG. 23 is a sectional view of a force-sensitive element on line 23-23 of FIG. 25.
Figure 24:
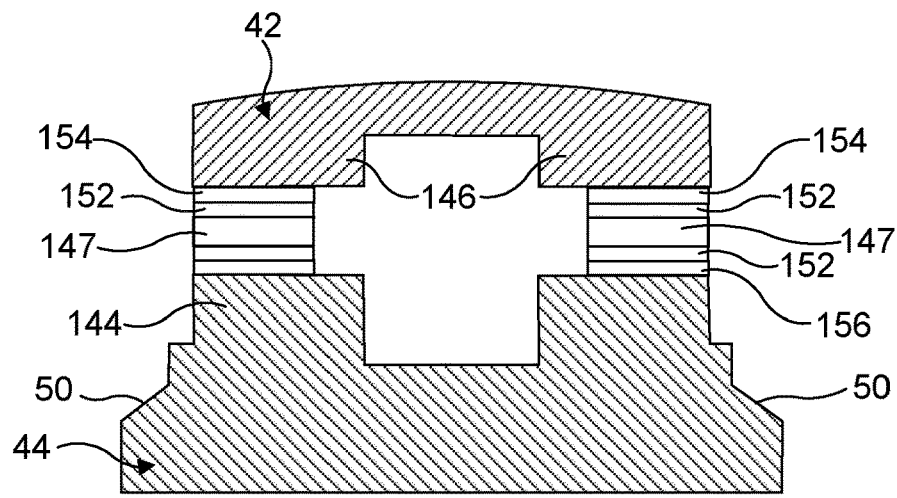
FIG. 24 is a sectional view of a force-sensitive element on line 24-24 of FIG. 25.
Figure 25:
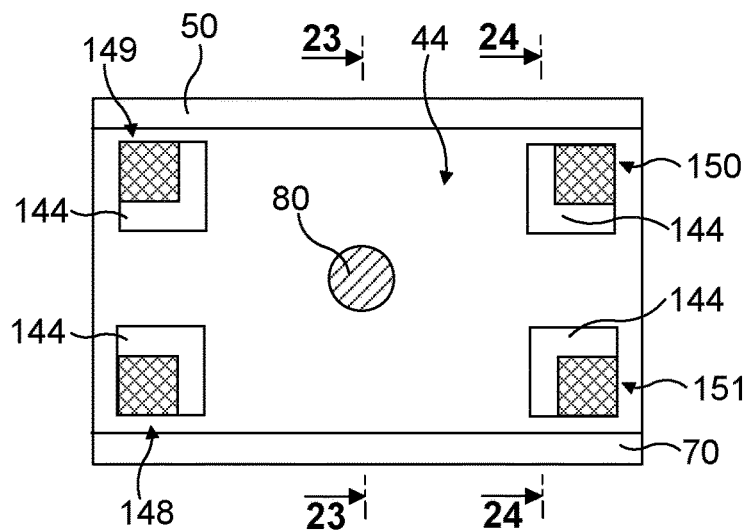
FIG. 25 is a sectional view on line 25-25 of FIG. 23.

FIGS. 23, 24, and 25 show an embodiment of a force-sensitive element where the element has the same overall outline as in FIGS. 5 to 7, but uses piezoelectric elements to measure force. The outer portion 42 is made in one piece, optionally with a central pin 140 that extends through a central hole in the attachment portion 44. The pin 140 may be threaded for a full or partial portion of its length and is secured to the attachment portion 44 by nut 142. At each corner, the attachment portion 40 of this embodiment has a pillar 144. Facing each pillar 144, the outer portion 42 has a projection 146. In some embodiments, the pillar 144 and projection 146 have correspondingly shaped faces (e.g., both can be square). A piezoelectric sensor may be inserted between the pillar 144 and projection 146 at each corner. The four sensors are indicated as 148-151 in FIG. 25.

Each sensor may be formed of a block 147 of piezoelectric material 147 with a conductive plate 152 at each face for electrical contact with the ceramic 147 and with insulating layers 154 to provide electrical insulation of the plates 152 from the outer portion 42 and attachment portion 44. Each piezoelectric sensor generates a charge difference between its opposite surfaces and hence a potential difference between conducting plates 152 in response to force on the piezoelectric material. The charge difference may not be sustained while force remains constant, but dynamically changing forces on the outward portion 42 lead to changing potential differences between the conducting plates 152 in contact with the block 147 of the piezoelectric material.

Radial force on the outer portion 42 is transmitted to the piezoelectric sensors equally. Axial force on the outer portion 42 will cause bending strain of the pin 140 so that force on the sensors 148, 149 at one axial end of the force-sensitive element will be different from force on sensors 150, 151 at the other end. Circumferential force on the outer portion 42 will lead to a difference between force on the sensors 148, 151 at one side of the force-sensitive element relative to force on the senses 149, 150 at the other side of the force-sensitive element.

The potential difference across each pair of plates 152 may be input to a differential amplifier and the output from the differential amplifier can be converted to digital form by an analog to digital converter (in like manner to that in FIG. 10). These potential differences at the plates 152 as amplified and digitized are then optionally processed by processor or computing device to extract measurements of axial, circumferential, and radial forces on the outer portion 42.

Another possible embodiment of force sensing element would use the geometry shown in FIGS. 23 to 25, but with piezoresistive sensing elements in place of the piezoelectric blocks 147.

Figure 26:
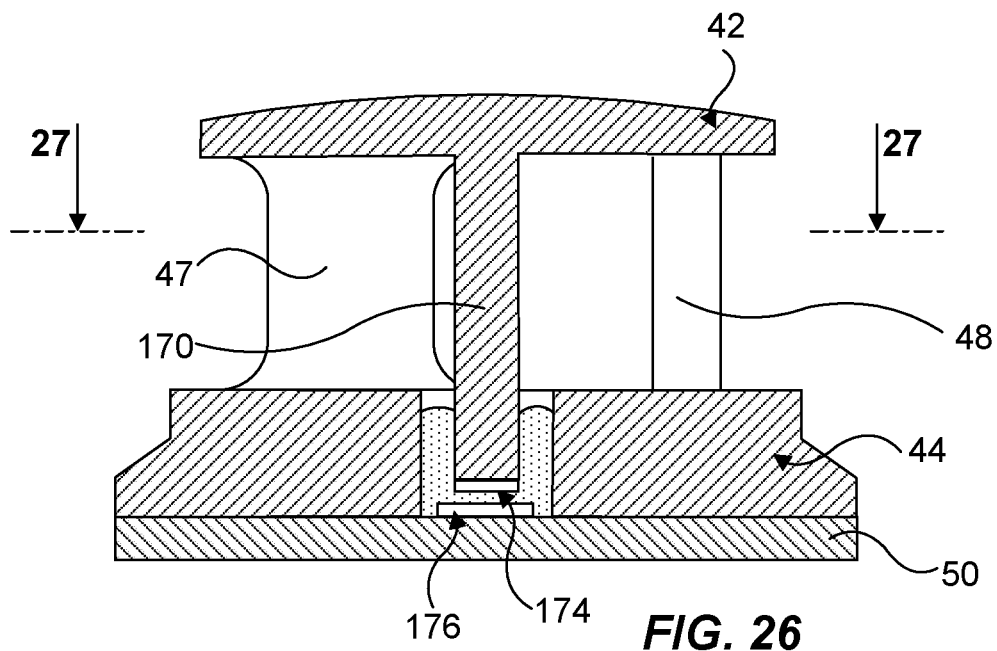
FIG. 26 is a sectional view of a force-sensitive element on line 26-26 of FIG. 27.
Figure 27:
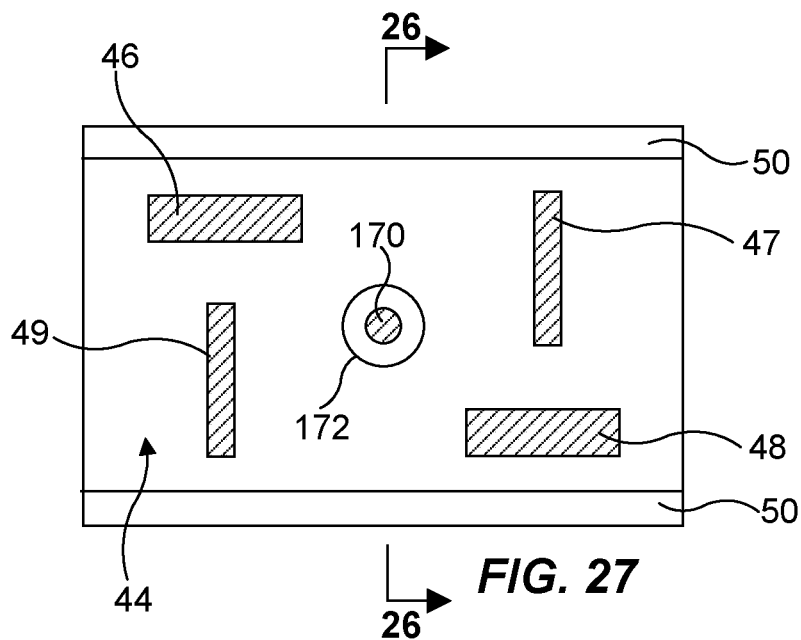
FIG. 27 is a sectional view on line 27-27 of FIG. 26.
Figure 28:
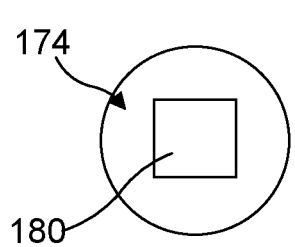
FIGS. 28 and 29 are enlarged face views of two parts of the capacitive sensor in FIGS. 26 and 27, according to an embodiment.

FIGS. 26 to 28 show an arrangement in which a force-sensitive element has the same general outline as in FIGS. 5 to 7, but force on the outer portion 42 causes distortion within the force-sensitive element and this is measured by means of a capacitive sensor. Similar to FIGS. 5 to 7, there is an outer pad 42, an attachment portion 44 and four connecting portions 46-49 rigidly connected to both the pad 42 and the attachment portion 44. Connecting portions 46-49 do not have sensors adhered to them. Instead, the outer portion 42 is rigidly connected to a central pillar 170 which projects into a hole 172 through the attachment portion. Force on the outer portion 42 causes strain of the connecting portions 46-49 and a small amount of movement of the outer portion 42 and the pillar 170 relative to the attachment portion 44. This distortion is observed with a capacitive sensor which has one part 174 attached to the pillar 170 and a second part 176 attached to a plate 178 which lies against the attachment portion 46. The attachment portion 44 and the plate 178 may conveniently be attached together during assembly, but both are clamped to the body 50 of the drill bit in the manner illustrated by FIG. 4. This holds the attachment portion and plate 178 firmly together.

Figure 29:
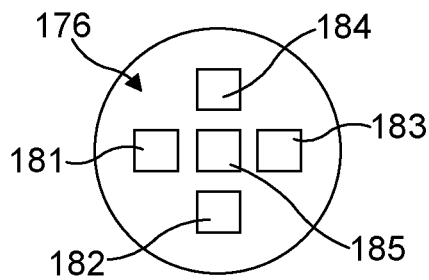

FIG. 28 shows the part 174. In this embodiment, the part 174 is a disc of electrically insulating material in which a polygonal (e.g., square) electrically conductive plate 180 is inset. FIG. 29 shows the part 176. It is a larger disc of insulating material in which five polygonal (e.g., square) electrically conductive plates 181-185 are inset. After assembly, the space between the discs 174,176 and around the end portion of pillar 170 can be filled with a sealant. An example sealant is silicone based and can cure to form an electrically insulating flexible material. The cured material may be sufficiently flexible that it does not prevent the movement of the outer portion 42 and pillar 170 relative to the attachment portion 44 when force acts on the outer portion 42.

Radial force on the outer portion 42 pushes the plate 180 closer to the conductive plates 181-185 on the part 176 and can be measured as an increase in capacitance of the capacitor formed by the plates 180 and 185. Axial force on the outer portion 42 causes distortion of the force-sensitive element in which the end of pillar 170 shifts slightly towards the plate 181 and away from plate 183 (or vice versa) and can be measured as a change in capacitance between the plates 180 and 181 relative to capacitance between the plates 180 and 183. Analogous to this, circumferential force causes the end of the pillar 170 to shifts slightly towards the plate 182 and away from plate 184 (or vice versa) and can be measured as a change in capacitance between the plates 180 and 182 relative to capacitance between the plates 180 and 184. These capacitance measurements are made by an electronics package which can repeatedly measure capacitances with alternating potentials applied to the plate 180 and each of the plates 181-185 in turn.

Another possible embodiment, which is similar in construction to the arrangement in FIGS. 26 to 28 omits the part 174 from the end of pillar 170 and provides inductive sensors at the positions of the plates 180-185. Forces on the outer pad causing distortion of the force-sensitive element cause changes in the position of the pillar 170 and hence changes in inductive coupling between the inductive sensors and the pillar 170. These changes are observed and measured as changes in the outputs from the inductive sensors at positions 180-185.

Figure 30:
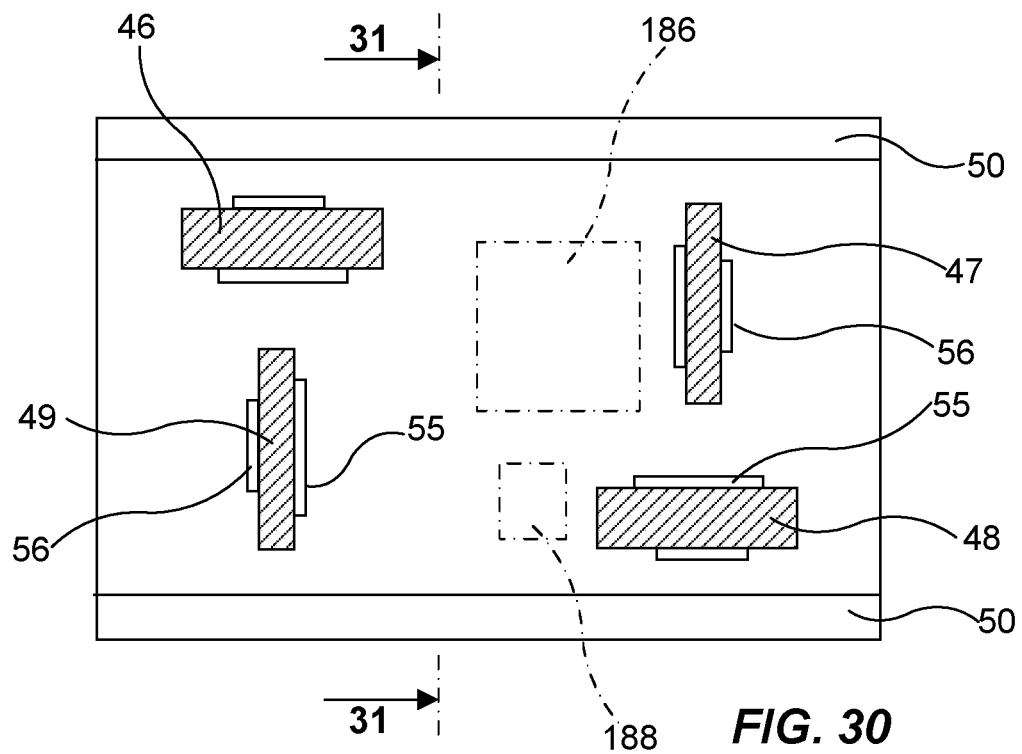
FIG. 30 is a sectional view of a force-sensitive element, according to an embodiment.
Figure 31:
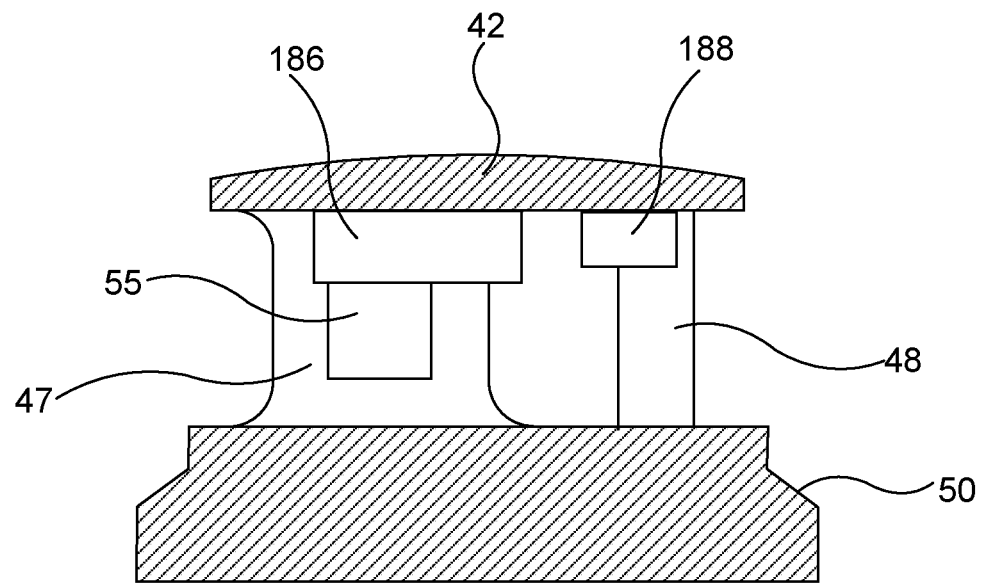
FIG. 31 is a sectional view on line 31-31 of FIG. 30.

Other types of sensors may be provided in addition to the force and strain sensors already mentioned. FIGS. 29 and 30 show a force-sensitive element which is very similar to that shown in FIGS. 5 to 7, but which is provided with additional sensors. As seen in the sectional view of FIG. 30, a three-axis accelerometer 186 can be attached to the inside face of the outer portion 42 with a temperature sensor 188 alongside it. The positions of the accelerometer 186 and temperature sensor 188 are indicated by dashed outlines in FIG. 29. The three-axis accelerometer 186 may for instance be a micro-electro-mechanical systems (MEMS) solid-state accelerometer, such as are available, for example, from Analog Devices, Inc. in Norwood, Massachusetts, USA.

By correlating output from the accelerometer 186 with output from the strain gauges 75, 76, 77, it is possible to distinguish between continuous or slowly changing force on the outer portion 42 of the force-sensitive element 40 and dynamic forces such as arise transiently if there is an impact between the outer portion 42 and the wellbore wall.

Figure 3:
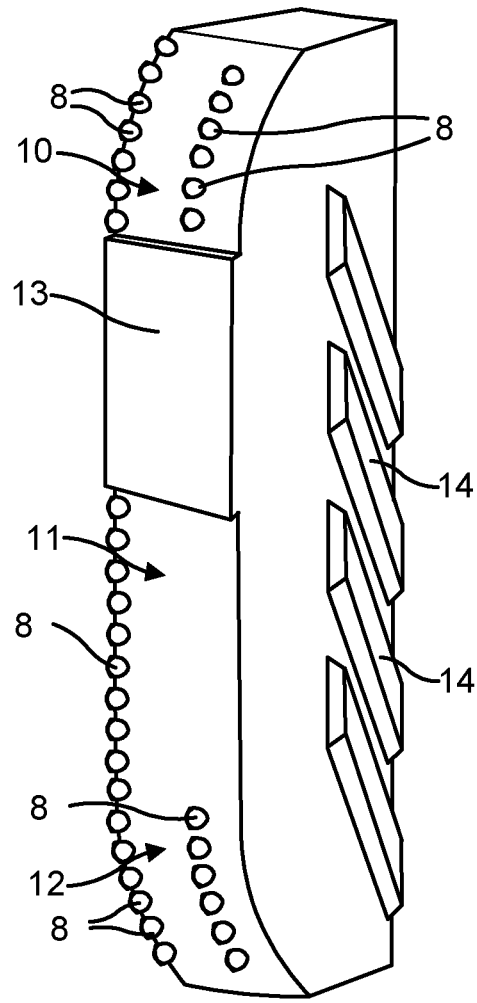
FIG. 3 is a perspective view of a cutter block for an expandable reamer.
Figure 32:
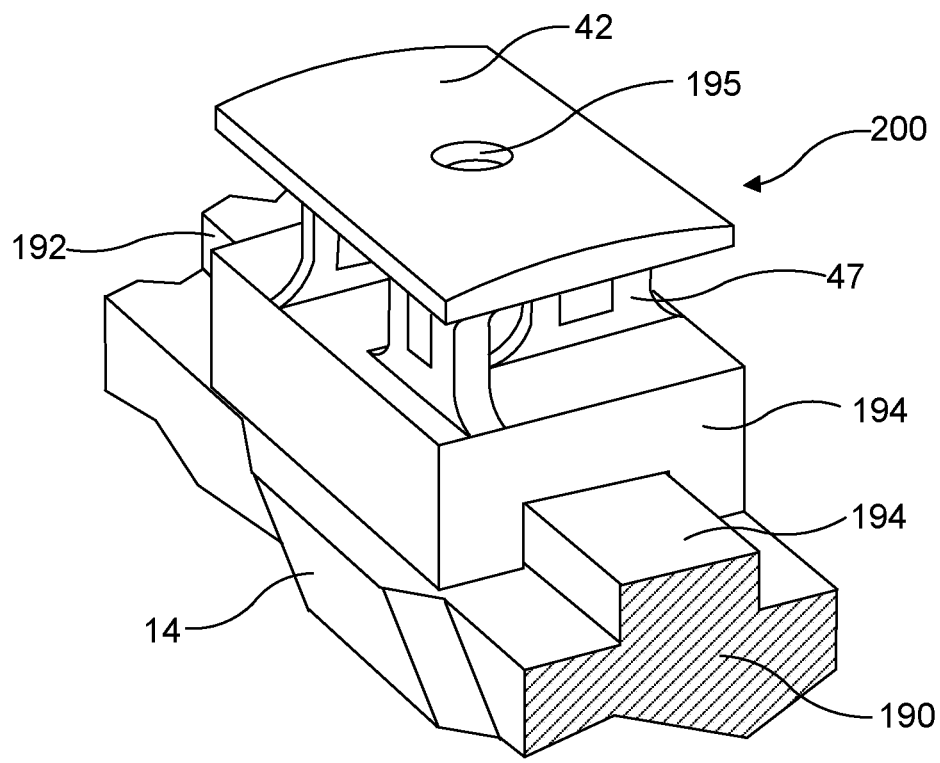
FIG. 32 is a perspective view of a force-sensitive element used in a reamer, mill, or stabilizer, according to an embodiment.
Figure 33:
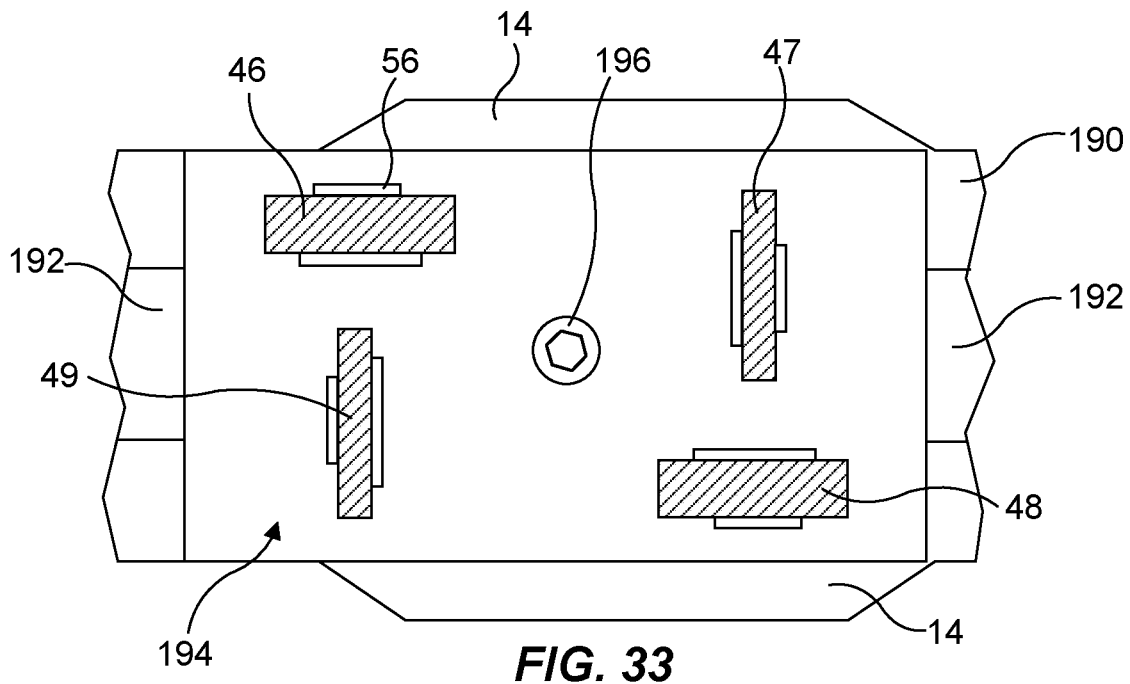
FIG. 33 is a sectional view, analogous to FIG. 8, showing parts of the force-sensitive element of FIG. 32.

FIGS. 32 and 33 show a force-sensitive element used to provide a gauge pad on a rotary tool which may be a reamer or hole opener equipped with blocks resembling that shown in FIG. 3. The block shown in FIG. 3 is fixed to a hole opener body, or may be radially expandable from the main body of a reamer under hydraulic pressure from fluid pumped down the drill string. The expansion can be guided by one or more splines 19 on the block which engage in grooves provided in the main body of the tool (or one or more grooves on the block which engage one or more splines on the body). A construction and an operating mechanism for a reamer of this kind includes the reamer described in U.S. Pat. Nos. 6,732,817 and 7,954,564, which are incorporated herein by this reference. As pointed out by the first of these, the structure and mechanism can be employed in an expandable stabilizer as well as in a reamer.

In the embodiment shown by FIGS. 32 and 33, a radially movable block can be constructed as an assembly of parts. In this embodiment, this includes an inner block 190, part of which is seen in FIG. 32. This inner block is provided with the splines 19 and has a projecting rib 192 extending along its outward facing surface. The outer part of the block can be formed by components shaped and arranged to mate with the rib 192, and which are bolted or otherwise fastened to the inner block 190. One of these components is optionally a force-sensitive element 208 constructed similarly to that of FIGS. 5 to 7. It has an outer portion 42 connected to an attachment portion 194 by one or more connecting portions 46-49 which are fitted with strain gauges 76, 77. The construction and operation of these strain gauges is as described herein with reference to FIGS. 5 to 14. The outer portion 42 includes a gauge pad to make sliding contact with a wellbore wall, and has a central hole 195 to provide access to a bolt 196, which secures the attachment portion 194 to the inner block 190.

Figure 35:
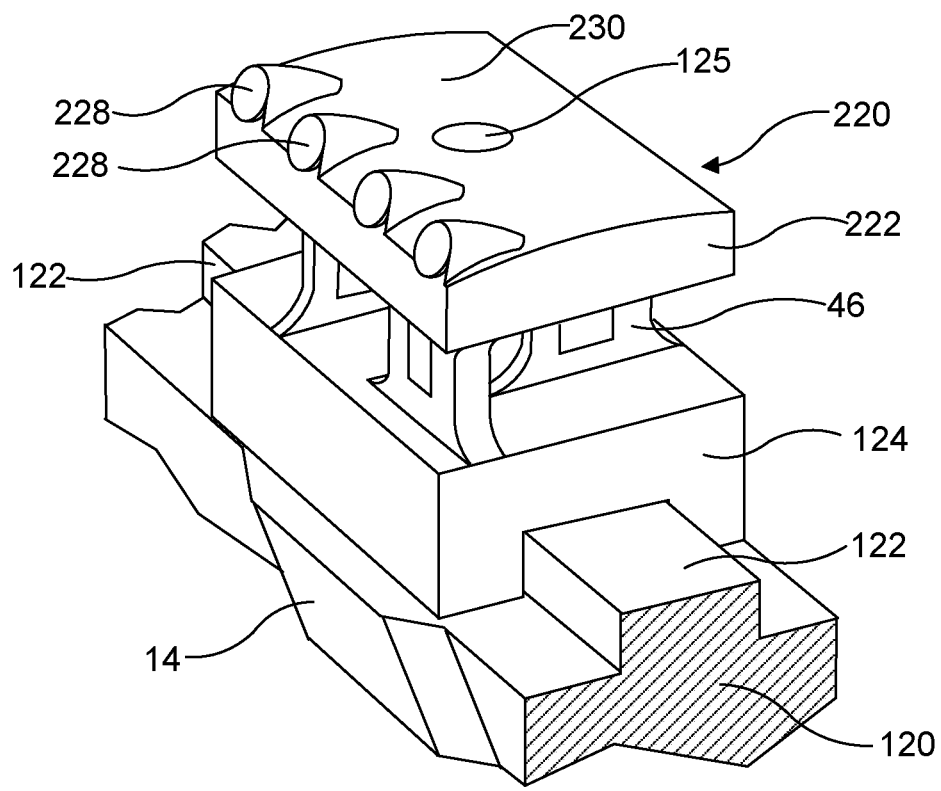
FIG. 35 is a perspective view of a cutter block of a reamer for removing material from a wellbore wall, according to an embodiment, and which incorporates a force-sensitive element such as that shown in FIG. 33.
Figure 36:
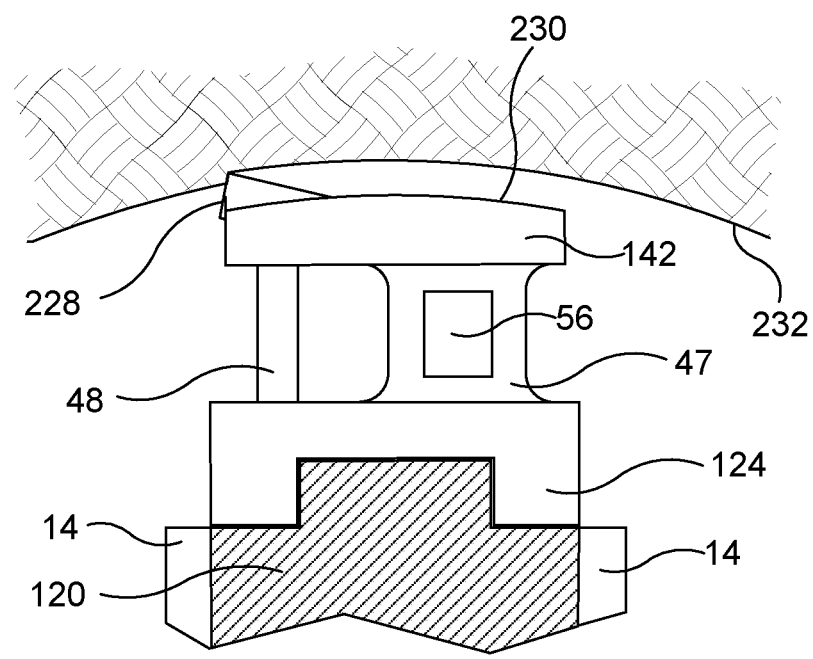
FIG. 36 is an end view of the force-sensitive element of FIG. 35, in contact with a conduit wall.

Structure as shown in FIGS. 35 and 36 may be part of a reamer, in which case other parts mounted astride the rib 192 are blocks with cutters fitted to them, to give an overall shape resembling that of the block shown in FIG. 3 (but with a force-sensitive element as gauge pad). The structure shown in FIGS. 32 and 33 can also be part of an expandable stabilizer, in which case there may be no outer blocks with cutters, and additional gauge pads are mounted to the rib 192. These additional pads may be solid parts with the same outline shape as the force-sensitive element shown in FIG. 32 or may be additional force-sensitive elements. One possible arrangement for a stabilizer block has force-sensitive elements at each end of inner block 190 and solid parts with the same outline positioned between them.

A further possibility is to use the structure of FIGS. 32 and 33 in an expandable tool intended to rotate within tubing placed within a wellbore. In such case, the outer portion 42 of a force-sensitive element will slide on the interior surface of the tubing. Other parts fitted astride the rib 192 may be blocks with attached cutters made of tungsten carbide for milling away unwanted restrictions in internal diameter (for instance at couplings between lengths of tubing) or for milling the inside wall of the tubing to enlarge it or even remove a section of tubing completely. This is illustrated by the example in FIG. 34, which shows an example of a tool to function as a casing or section mill inside tubing. The tool has a tubular main body accommodating cutter blocks which are expandable in the manner as shown and described for reamers in U.S. Pat. Nos. 6,732,817 and 7,954,564.

Figure 34:
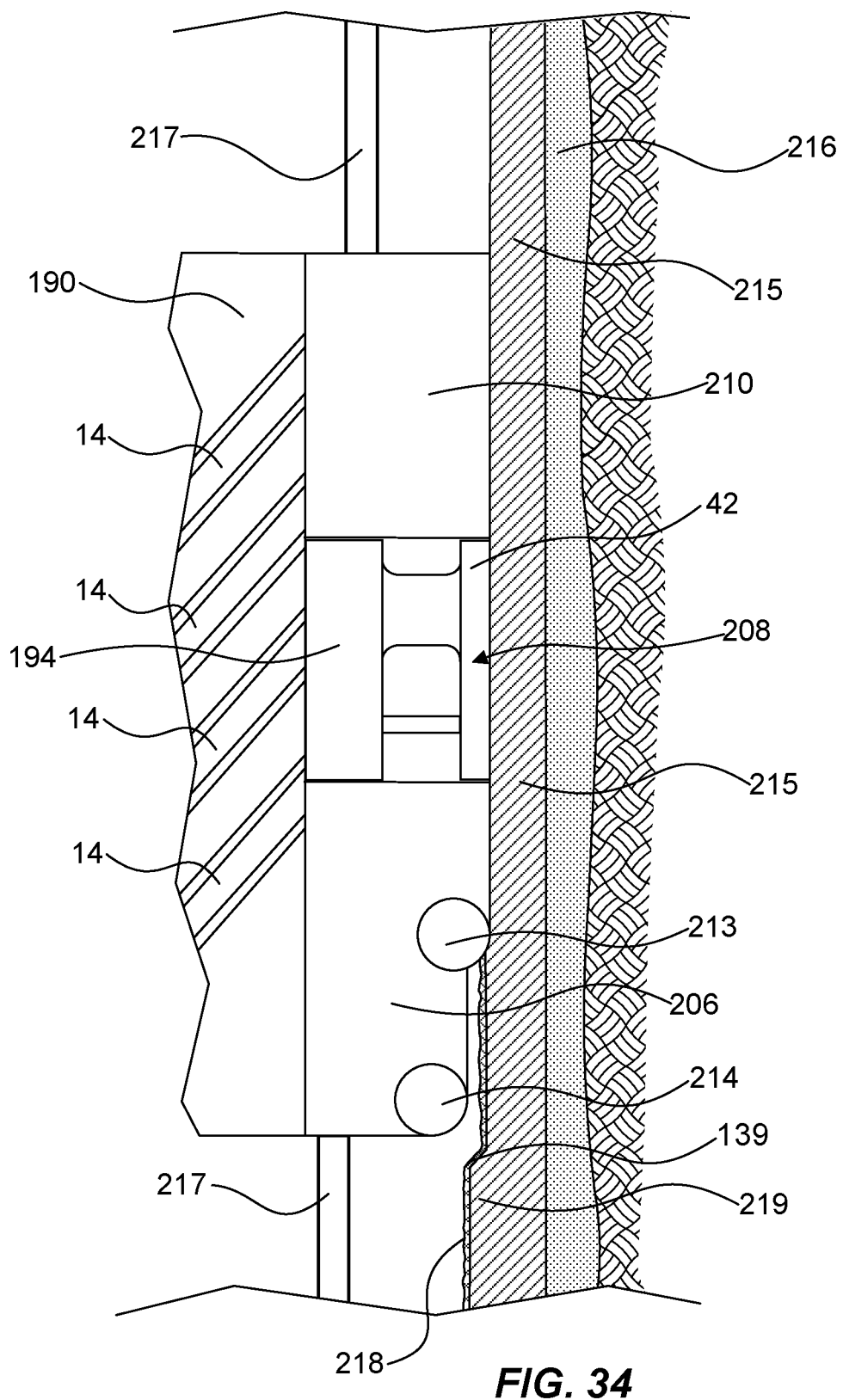
FIG. 34 is a side view of a cutter block or milling blade, according to an embodiment, and which incorporates a force-sensitive element as shown in FIG. 33.

Cutter blocks having inner parts 190 and splines 19 as shown in FIG. 30, are distributed azimuthally around the tool body. FIG. 34 shows one of these blocks. The inner part 190 of the block has a rib 192 as shown in FIG. 32 (although this cannot be seen in FIG. 34). Fitted astride this rib 192 are at least three outer sections. These include a first cutter section 206 at the leading axial end of the block, a force-sensitive element 208 of the type shown in FIGS. 32 and 33, and a further section 210 that may be a stabilizer or gauge pad, or may have cutters in some embodiments.

The first cutter section 206 can be made of any suitable material (including steel or matrix material). As shown in FIG. 34, the first cutter section 206 can include one or more cutters (two cutters 212, 213 are shown) coupled thereto. Each of these cutters can include a cylinder of sintered tungsten carbide partially embedded in a cavity/pocket in the steel, with an exposed planar or non-planar end face of the cylinder facing in the direction of rotation and providing a cutting surface. The outer portion 42 of the force-sensitive element 208 may be positioned at the same radial distance from the tool axis as the outer extremity of cutter 212. FIG. 34 shows the tool in use within tubing 215 which is secured in a wellbore with cement 216 between the tubing and the surrounding formation, although the cement 216 may be between the tubing and an outer tubing/casing. Because the block is extended through an aperture in the main body of the tool, an edge of the tool body is seen at 217.

The radially outer extremity of cutter 212 is at a distance from the tool axis which is slightly greater than the original inner radius of the tubing 215. As the tool rotates and advances axially, the cutter 212 removes corrosion 218 from the tubing interior and also removes a small thickness from the interior wall of the tubing. This creates a new and clean interior surface on which the outer portion 22 of the force-sensitive element 208 slides as a gauge pad, thus positioning the tool on the axis of the tubing.

Projections inwardly into the tubing interior, as for instance seen at 139, may occur at couplings between lengths of tubing. When an inward projection 139 is encountered, some of the projection is removed by the cutter 214 and the remainder is removed by the following cutter 214. Overall, therefore, the tool is a rotary mill which functions to mill away any inward projections and interior corrosion from the internal surface of tubing and thereby create a uniform internal diameter within the tubing.

The force-sensitive element 208 is fitted with strain gauges and functions in the same manner as the element described with reference to FIGS. 5 to 13 above. It therefore can serve to separate and measure forces on the outer portion 22 of the force-sensitive element 208 in radial, axial, and circumferential directions.

FIGS. 35 and 36 show a force-sensitive element 220 that can be used in an expandable reamer. In part it is similar to the element shown in FIGS. 32 and 33 with an attachment portion 124 fitting astride a rib on the inner block 120. However, the outer portion 222 is a block having cavities in which cutters 228 are secured so that they project upwardly from the surface 230. As shown by FIG. 36, the cutters 228 remove material from the wall 232 of the wellbore as the tool rotates and the surface 230 following the cutters 228 is spaced from the wellbore wall 232. As in other embodiments, the outer portion 222 is connected to an attachment portion 124 by one or more connecting portions 46-49 which are fitted with strain gauges 76, 77. The construction and operation of these strain gauges can be the same as described for other gauges herein. They serve to measure forces on the cutters 228 which are transmitted to the outer portion 222 as the reamer rotates. Additionally, while FIGS. 35 and 36 depict the attachment portion 124 as a separate part that is coupled to the inner block 120, in some embodiments the attachment portion 120 and inner block 120 are integral components formed together rather than as separate components.

Figure 37:
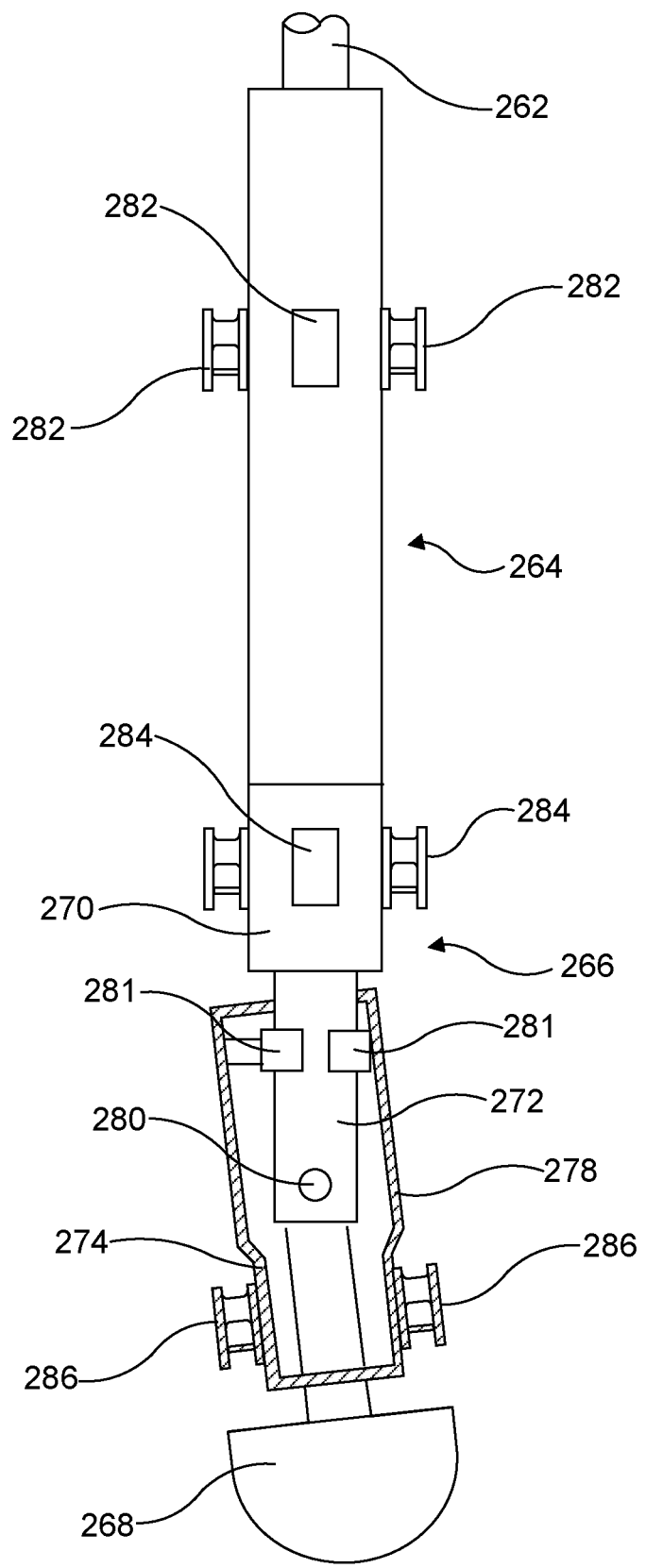
FIG. 37 is a schematic side view of a rotary steerable system coupled to a drill bit, partially shown in section, according to an embodiment.

FIG. 37 shows a BHA containing a rotary steerable system for a drill bit. A drill collar 264 is attached to the downhole end of a drill string 162, a rotary steerable tool 266 is attached to the collar 264, and a drill bit 268 is attached the steerable tool 266.

The rotary steerable tool has a part 270 which is attached to the drill collar 264 and is continued by a part 272 of smaller diameter. A part 274 attached to the drill bit 268 is connected to the part 272 at a universal joint. A pivot of the universal joint is indicated schematically at 280. The part 274 includes a hollow section 278 which extends around the part 272. Actuators 281 can operate to incline the hollow section 278 together with the rest of part 274 and the drill bit 268 at an angle to the part 276, thus creating a bend in the bottom hole assembly, as shown. When it is required to change the direction of the wellbore being drilled, the actuators 281 are operated to keep the part 278 inclined towards the desired drilling direction as the drill string is rotated, thus steering the drill bit.

FIG. 37 shows this general arrangement schematically and does not provide constructional details of the mechanism for angling the part 278 of the steerable assembly relative to the part 276. Rotary steerable systems which operate by creating a bend in a bottom hole assembly and so putting the direction of the drill bit at an angle inclined relative to the axis of the drill string above it are described in U.S. Pat. Nos. 7,188,685, 6,364,034, 6,244,361, 6,158,529, 6,092,610, and 5,113,953 as well as U.S. Patent Application No. 2001/0052428, each of which is incorporated herein by this reference. Attention is therefore directed to these documents for disclosures of possible constructional arrangements.

The bottom hole assembly shown in FIG. 37 is fitted with one or more force-sensitive elements of the type described with reference to FIGS. 5 to 13. Multiple force-sensitive elements can be distributed both axially and azimuthally. Illustratively, four of such elements 282 are distributed azimuthally around the drill collar 264 with their attachment portions rigidly attached to the drill collar 264, and four more of such force-sensitive elements 284 are distributed azimuthally around the part 270 attached to the drill collar. A further four such units 286 can be distributed around the hollow part 278 of the steerable tool, with corresponding attachment portions rigidly attached to this part 278 of the steerable tool.

The outer surfaces of the force-sensitive elements 282, 284, 286 are at the radius drilled by the bit 268 and can therefore act as gauge or stabilizing pads in contact with the wall of the drilled wellbore. They can each measure forces radially, axially, and circumferentially. In some embodiments, the force-sensitive elements 286 can measure forces on the steerable part of the tool while the force sensing elements 282 and 284 can measure forces on the BHA above the universal joint.

While this BHA has been described as having force-sensitive elements around it at three axially spaced positions, it is possible that the elements 282, the elements 284, or both could be replaced with gauge pads devoid of instrumentation. Similarly, drill bits described herein could include pads devoid of instrumentation or could include extensions of blades rather than the pads described herein. Thus, one or more blades of a bit (and less than all blades of the bit) may have pads and/or instrumentation. Similarly, one or more cutter or stabilizer blocks, milling knives, or the like may lack instrumentation or may not have a pad, but may instead be a blade, while other one or more cutter or stabilizer blocks, milling knives, or the like may have instrumentation and/or a gauge pad.

Figure 38:
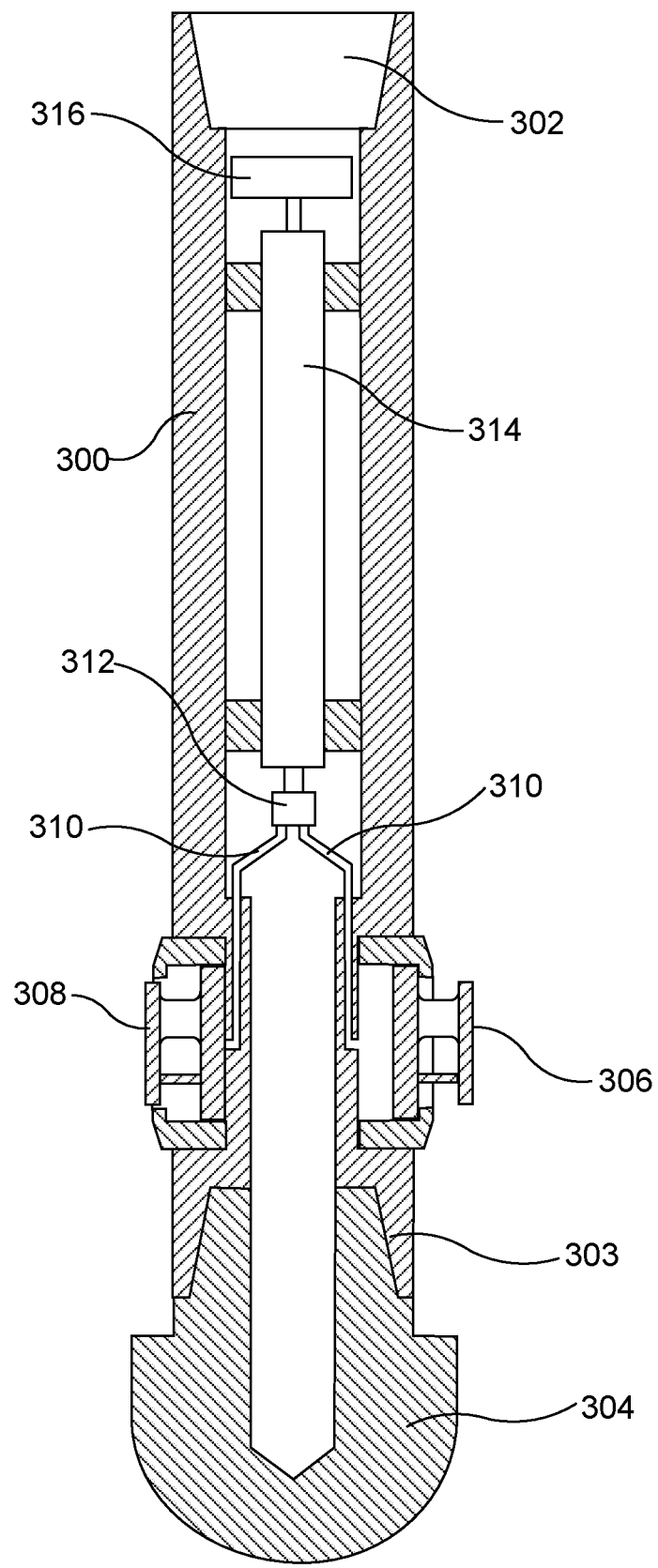
FIG. 38 is a schematic, cross-sectional view of a rotary steerable system, according to an example embodiment.
Figure 39:
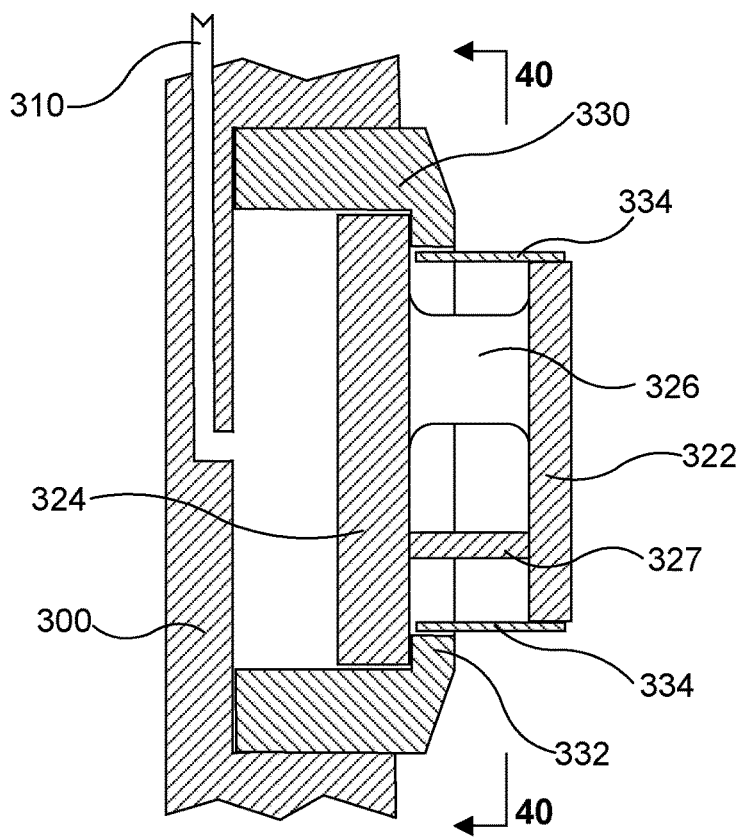
FIG. 39 is an enlarged view of a part of FIG. 38 with a protective skirt shown, according to an embodiment.
Figure 40:
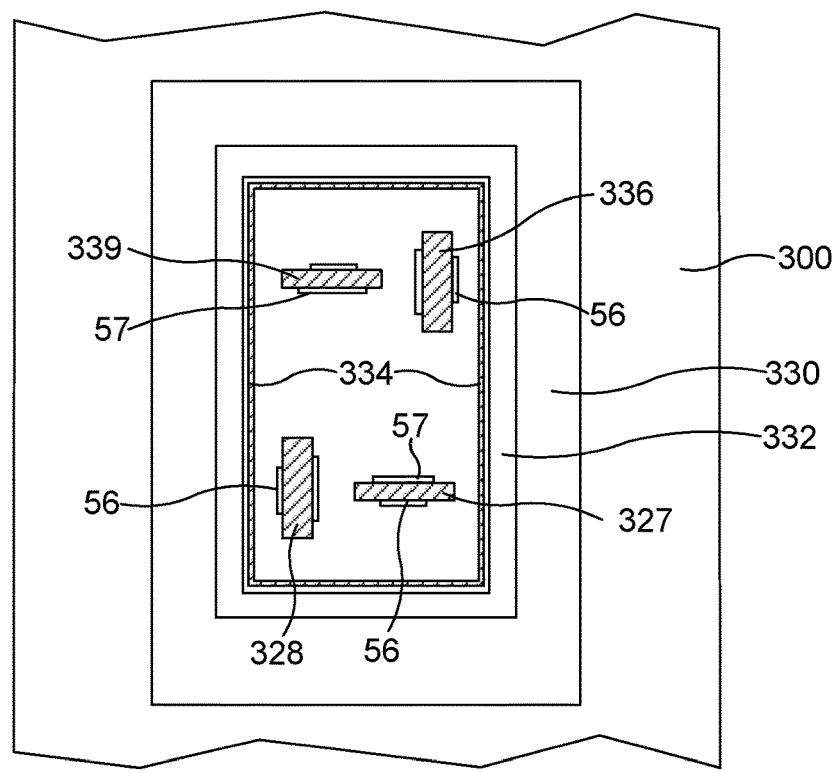
FIG. 40 is a view on line 40-40 of FIG. 39.

FIGS. 38 to 40 show a different type of rotary steerable system, again fitted with force-sensitive elements as described herein. The general construction of this rotary steerable system is similar to that shown in U.S. Pat. No. 8,672,056, the disclosure of which is incorporated herein by reference.

The rotary steerable tool has a main body 300 with a connector 302 at its uphole end for attaching to a drill string and a connector 303 at its downhole end to which a drill bit 304 is attached. Near its downhole end, the steerable tool has pads which can be extended by hydraulic pressure. For purpose of explanation, two diametrically opposite pads 306, 308 are shown, but three or even four pads distributed around the tool axis may be used. Fluid to extend the pads is supplied along hydraulic lines 310 from a valve 312 which allows the pads to be extended individually. It can be seen in FIG. 38 that pad 306 is extended but pad 308 is not. When it is required to change the direction in which the wellbore is being drilled, the valve 312 is operated to extend individual pads to push against one side of the wellbore wall as the assembly rotates. The effect is to steer the drill bit towards the opposite side of wellbore.

Rotary steerable systems which function by selectively extending pads to push against one side of the wellbore wall as the steerable tool and attached drill bit rotate described in U.S. Pat. Nos. 5,502,255, 5,706,905, 5,971,085, 6,089,332, and 8,672,056, which are each incorporated herein by this reference. In the tool shown here, the valve is operated by a unit 314 powered by turbine 316 in the path of the drilling fluid pumped to the drill bit. Details of a rotary valve 312 and operating arrangements for it are given in U.S. Pat. No. 8,672,056.

The steering pads of this embodiment are provided as force-sensitive elements with construction resembling the elements 30 shown in FIGS. 5 to 7. FIGS. 39 and 40 show one of these force-sensitive elements. Outer portion 322 provides the pad to contact the wellbore wall and is coupled to a piston 324 by connecting portions 326-329. This piston 324 is movable within a cylinder defined by a housing 330 rigidly attached to the main body 300 of the steerable tool. A hydraulic line 310 leads into the cylinder defined by the housing 330 and the piston is retained in the housing by a lip 332. The connecting portions 326-329 are shown in section in FIG. 40, and extend between and are rigid with the outer portion 322 and the piston 324. They may be shaped and arranged as in FIGS. 5 to 7 and provided with strain gauges 36, 37 whose positioning and function is as described with reference to FIGS. 8 to 12.

As previously described with reference to FIG. 21, after manufacture of the parts 322-329 and the attachment of strain gauges 36, 37 and connecting wiring, a skirt 334 of material (e.g., sheet metal) is optionally welded or otherwise coupled to edges of outer pad 322 or the piston 324 and the volume within the skirt can be filled with flexible, electrically insulating material (e.g., polyurethane polymer). The skirt 334 is not shown in FIG. 38 but is shown in section in FIGS. 39 and 40.

When a force-sensitive element is extended by hydraulic pressure so that its outer portion 322 acts as a steering pad pressing on the wellbore wall, the strain gauges 36, 37 on its connecting portions 326-329 provide measurements of axial, circumferential, and radial forces in the same manner as previously described with reference to FIGS. 8-12.

It will be appreciated that radial force on the outer portion 322 will be transmitted through the connecting portions 326-329 and the piston 324 to the hydraulic fluid behind the piston 324. This hydraulic fluid will have some compliance and consequently will also undergo compressive strain. However, force is transmitted through the outer portion 322, the connecting portions, the piston 324 and the hydraulic fluid in series. Consequently, they are all exposed to the force and so the connecting portions will undergo compressive strain which can be measured by the strain gauges even though the force is transmitted onwards to the hydraulic fluid.

Concepts disclosed herein are not limited to any specific category of rotary tool and have been exemplified for a variety of rotary tools intended for operating within a conduit which may be a wellbore or may be tubing within the wellbore. The force-sensitive elements allow measurement of forces on pads which contact the conduit wall and the forces may be resolved into measurable forces in the radial, axial and circumferential directions. The measured data may be transmitted to the surface using known technologies for transmission of data from a bottom hole assembly to the surface, may be recorded downhole for later analysis, or may be processed by downhole electronics, and an alarm communication sent the surface if forces exceed expected magnitudes.

The example embodiments described in detail above can be modified and varied within the scope of the concepts which they exemplify. Features referred to above or shown in individual embodiments above may be used separately or together in any combination so far as this is possible. More specifically any of the force-sensitive elements described herein may be used in any of the rotary tools described herein. The drill bit shown in the drawings is a fixed cutter drill bit, but the sensor arrangements described herein could also be employed on a different type of drill bit such as a roller cone drill bit, an impregnated bit, a percussion hammer bit, or a coring bit. Accordingly, all such modifications are intended to be included within the scope of this disclosure as defined in the following claims.

The invention claimed is:

1. A rotary tool for operation within a wellbore, the rotary tool comprising:
   a tool body; and
   at least one force-sensitive element coupled to the tool body and positioned to contact a wall of the wellbore, the force-sensitive element including:
      an outer portion positioned to contact the wall of the wellbore;
      an attachment portion opposite the outer portion and secured to the tool body;
      at least one connecting portion which is more compliant than the outer portion and through which the outer portion is coupled to the tool body, the at least one connecting portion extending between the attachment portion and the outer portion; and
      at least one sensor responsive to force on the outer portion transmitted through the force-sensitive element to the tool body.

2. The rotary tool of claim 1, the at least one sensor being responsive to distortion of the force-sensitive element by force on the outer portion.

3. The rotary tool of claim 2, the at least one sensor being responsive to distortion of the at least one connecting portion by force on the outer portion.

4. The rotary tool of claim 3, the at least one sensor being coupled to the at least one connecting portion.

5. The rotary tool of claim 2, the at least one sensor being responsive to changes in relative position within the at least one force-sensitive element.

6. The rotary tool of claim 1, the at least one sensor being responsive to force transmitted through the force-sensitive element and applied to the at least one sensor.

7. The rotary tool of claim 1, a total cross-sectional area of the at least one connecting portion being less than an area of an outer surface of the outer portion that is positioned to contact the wall of the wellbore.

8. The rotary tool of claim 7, the outer surface being smooth, curved, and part-cylindrical.

9. The rotary tool of claim 1, being rigidly attached to both the outer portion and the attachment portion.

10. The rotary tool of claim 9, the at least one connecting portion including a plurality of connecting portions between the outer portion and the attachment portion, and a total cross-sectional area of the plurality of connecting portions being less than an area of the outer portion.

11. The rotary tool of claim 1, the at least one sensor including a plurality of sensors responsive to both direction and magnitude of forces causing distortion of the at least one connecting portion.

12. The rotary tool of claim 1, the at least one connecting portion including at least two connecting portions through which the outer portion is coupled to the tool body, with a first of the at least two connecting portions having greater compliance in an axial direction of the rotary tool than in a circumferential direction thereof while a second of the at least two connecting portions has greater compliance in the circumferential direction of the rotary tool than in the axial direction.

13. The rotary tool of claim 1, the at least one sensor including at least one of a relative position sensor, a piezoelectric or piezoresistive force sensor, or a strain sensor coupled to the at least one connecting portion.

14. The rotary tool of claim 13, the strain sensor coupled to the at least one connecting portion including at least one of an electrical resistance strain gauge, an optical fiber Bragg grating sensor, a piezoresistive strain sensor, or a piezoelectric strain sensor.

15. The rotary tool of claim 1, the force-sensitive element being a separate part coupled to the tool body.

16. The rotary tool of claim 1, the tool body including a drill bit body, a reamer body, a stabilizer body, a mill body, or a rotary steerable body.

17. A method of observing forces on a rotary tool, comprising:

positioning a rotary tool within a wellbore, the rotary tool including one or more force sensing elements coupled to a tool body of the rotary tool and positioned to contact a wall of the wellbore, the force-sensitive element including:
an outer portion configured to contact the wall of the wellbore;
at least one connecting portion which is more compliant than the outer portion and through which the outer portion is connected to the tool body; and
at least one sensor responsive to force on the outer portion transmitted through the force-sensitive element to the tool body, the at least one sensor being located on the at least one connecting portion; and
observing or recording data from the at least one sensor while operating the rotary tool within the wellbore.

18. The method of claim 17, the at least one sensor including a plurality of sensors coupled to the at least one connecting portion, the plurality of sensors including at least:
at least one first sensor responsive to at least one of axial strain or circumferential strain, but not radial strain; and
at least one second sensor responsive to radial strain but not to axial or circumferential strain.

19. The method of claim 18, the at least one first sensor including at least two chevron strain gauges, and the at least one second sensor including at least two Poisson gauges.

20. The method of claim 17, the at least one connecting portion including a plurality of connecting portions including at least a first connecting portion oriented perpendicularly relative to at least a second connecting portion of the plurality of connecting portions.

* * * * *